United States Patent
Nakayama et al.

(10) Patent No.: US 10,470,231 B2
(45) Date of Patent: Nov. 5, 2019

(54) INFORMATION PROCESSING APPARATUS, INFORMATION PROCESSING METHOD, INFORMATION PROCESSING SYSTEM, AND PROGRAM

(71) Applicant: Sony Corporation, Tokyo (JP)

(72) Inventors: Tetsunori Nakayama, Tokyo (JP);
Yusuke Fujimoto, Kanagawa (JP);
Masahiro Shimizu, Tokyo (JP);
Masahiro Watanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/545,885

(22) PCT Filed: Feb. 5, 2016

(86) PCT No.: PCT/JP2016/000612
§ 371 (c)(1),
(2) Date: Jul. 24, 2017

(87) PCT Pub. No.: WO2016/151995
PCT Pub. Date: Sep. 29, 2016

(65) Prior Publication Data
US 2018/0020495 A1  Jan. 18, 2018

(30) Foreign Application Priority Data
Mar. 24, 2015 (JP) .................. 2015-060990

(51) Int. Cl.
*H04W 76/16* (2018.01)
*H04L 29/06* (2006.01)
(Continued)

(52) U.S. Cl.
CPC ........... *H04W 76/16* (2018.02); *H04L 63/083* (2013.01); *H04L 63/18* (2013.01); *H04W 12/003* (2019.01);
(Continued)

(58) Field of Classification Search
CPC ... H04W 76/16; H04W 12/06; H04W 76/026; H04W 88/06; H04L 63/083; H04B 5/02
See application file for complete search history.

(56) References Cited

U.S. PATENT DOCUMENTS

| | | | |
|---|---|---|---|
| 7,158,756 B2 * | 1/2007 | Palin ................. | H04L 63/18 380/270 |
| 2002/0047910 A1 * | 4/2002 | Tariki ............... | H04N 5/23203 348/239 |

(Continued)

FOREIGN PATENT DOCUMENTS

| | | |
|---|---|---|
| EP | 1 742 421 A1 | 1/2007 |
| JP | 2005-303947 A | 10/2005 |

(Continued)

OTHER PUBLICATIONS

Japanese Office Action dated Oct. 17, 2017 for corresponding Japanese Application No. 2015-060990.

(Continued)

*Primary Examiner* — Nguyen T Vo
(74) *Attorney, Agent, or Firm* — Michael Best & Friedrich LLP

(57) ABSTRACT

An information processing apparatus is disclosed comprising a control circuitry configured to control communication with another information processing apparatus using a first communication mode, control communication with the another information processing apparatus using a second communication mode, establish a first connection with the another information processing apparatus using the first communication mode and prompt the another processing apparatus to execute a process through the first connection after establishing the first connection with the another information processing apparatus but prior to completing, through the first connection, a second connection with the (Continued)

another information processing apparatus using the second communication mode.

29 Claims, 13 Drawing Sheets

(51) Int. Cl.
| | |
|---|---|
| *H04W 12/08* | (2009.01) |
| *H04W 12/06* | (2009.01) |
| *H04W 12/00* | (2009.01) |
| *H04W 84/12* | (2009.01) |
| *H04W 84/18* | (2009.01) |
| *H04W 88/06* | (2009.01) |

(52) U.S. Cl.
CPC .......... *H04W 12/06* (2013.01); *H04W 12/08* (2013.01); *H04W 84/12* (2013.01); *H04W 84/18* (2013.01); *H04W 88/06* (2013.01)

(56) References Cited

U.S. PATENT DOCUMENTS

| | | | | |
|---|---|---|---|---|
| 2007/0021058 A1* | 1/2007 | Arseneau | ............. | G06F 1/1626 455/3.06 |
| 2009/0215398 A1* | 8/2009 | Adler | ............. | H04L 63/08 455/41.3 |
| 2009/0221271 A1* | 9/2009 | Soma | ............. | H04M 1/7253 455/414.1 |
| 2010/0015919 A1* | 1/2010 | Tian | ............. | H04W 12/06 455/41.2 |
| 2010/0253842 A1* | 10/2010 | Huang | ............. | H04N 5/77 348/552 |
| 2013/0029596 A1 | 1/2013 | Preston et al. | | |
| 2014/0073246 A1* | 3/2014 | Sip | ............. | H04W 76/025 455/41.2 |
| 2016/0081135 A1* | 3/2016 | Kang | ............. | H04R 3/00 455/41.2 |
| 2016/0248964 A1* | 8/2016 | Okamoto | ............. | G03B 17/561 |

FOREIGN PATENT DOCUMENTS

| | | |
|---|---|---|
| JP | 2009-544231 A | 12/2009 |
| JP | 2010-279042 A | 12/2010 |
| JP | T-2014-529210 | 10/2014 |
| WO | 2012/123868 A1 | 9/2012 |

OTHER PUBLICATIONS

Japanese Office Action dated Mar. 20, 2018 for corresponding Japanese Application No. 2015-060990.

* cited by examiner

[Fig. 1]
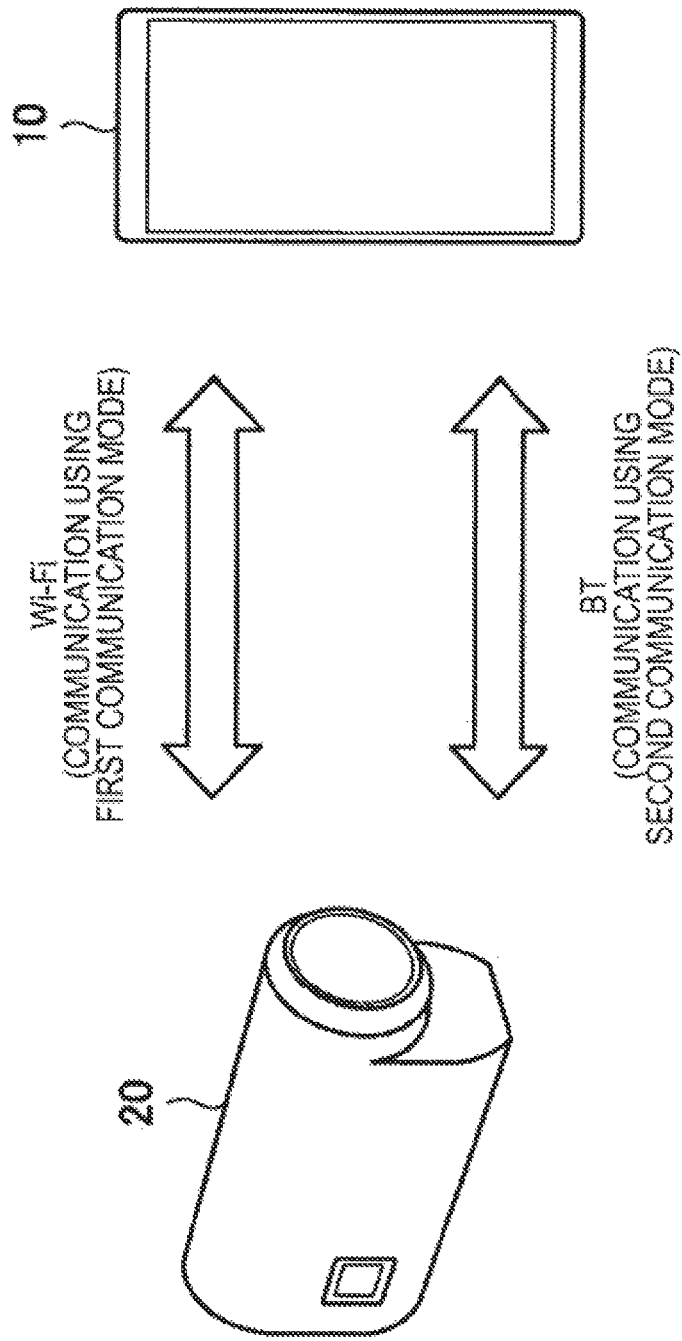

[Fig. 2]
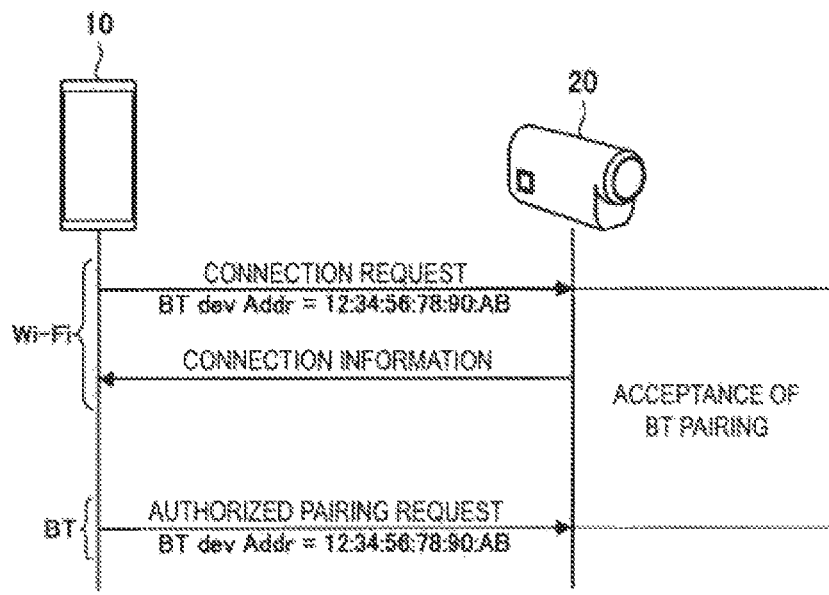
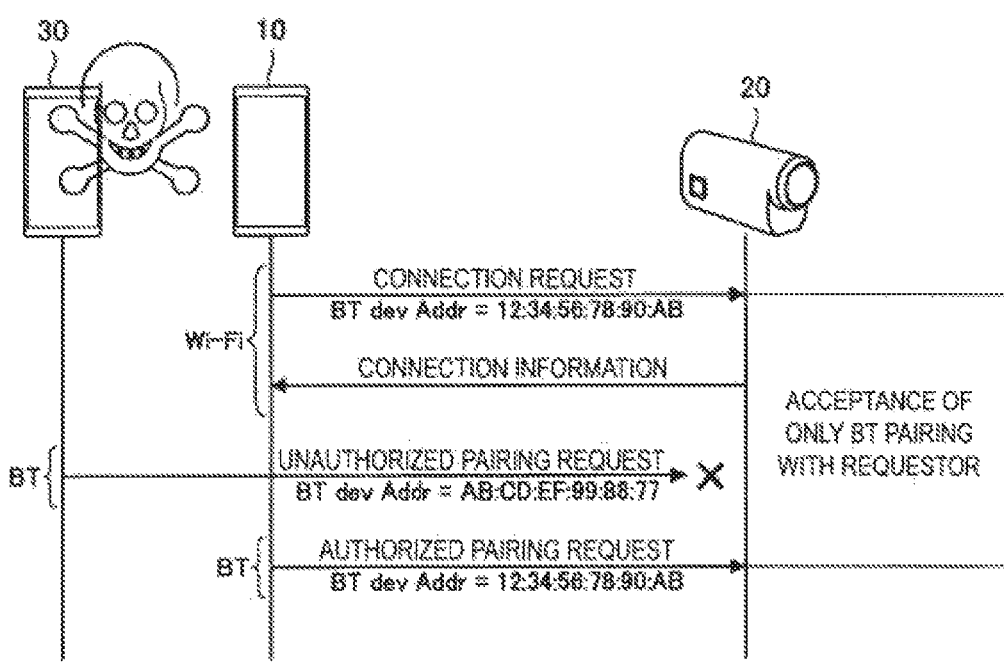

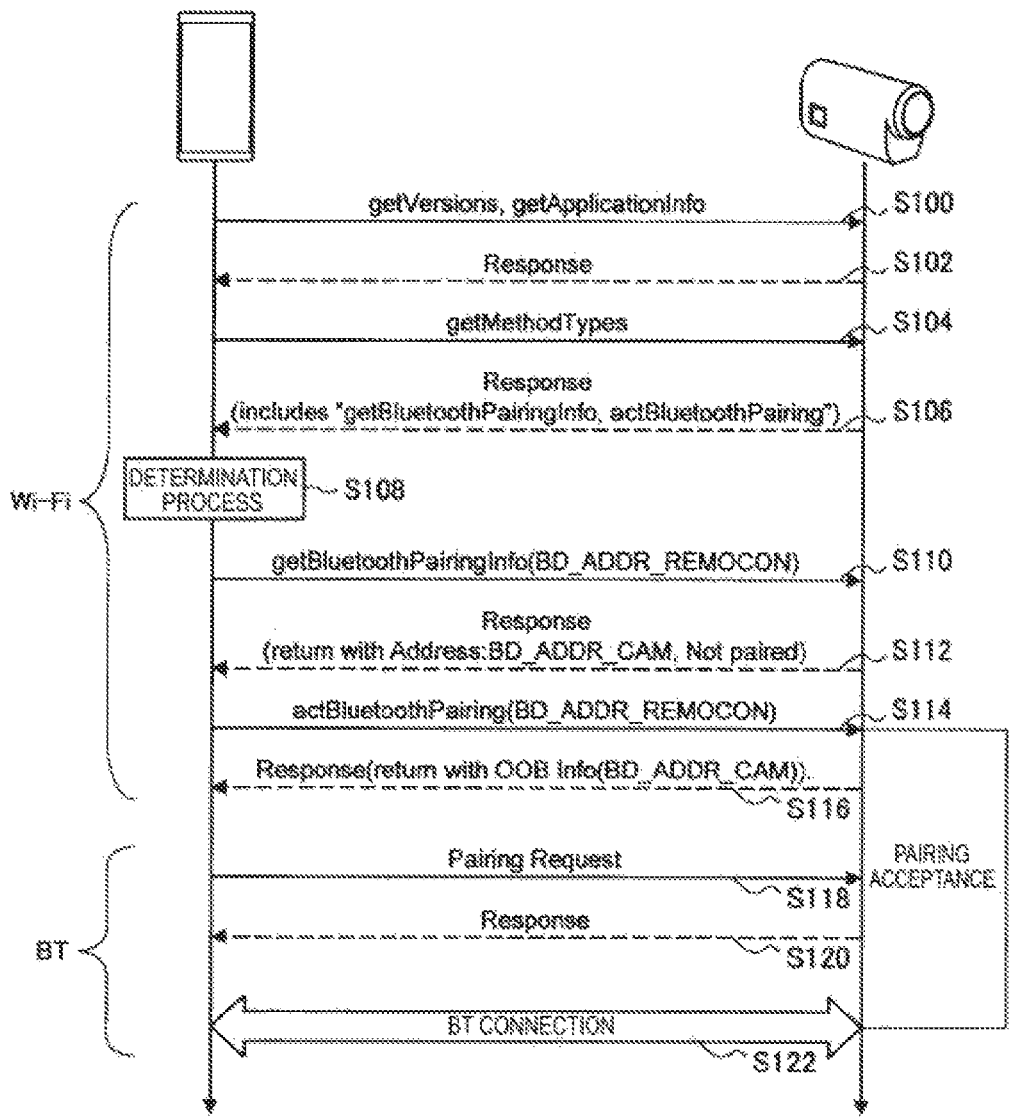
[Fig. 3]

[Fig. 4]
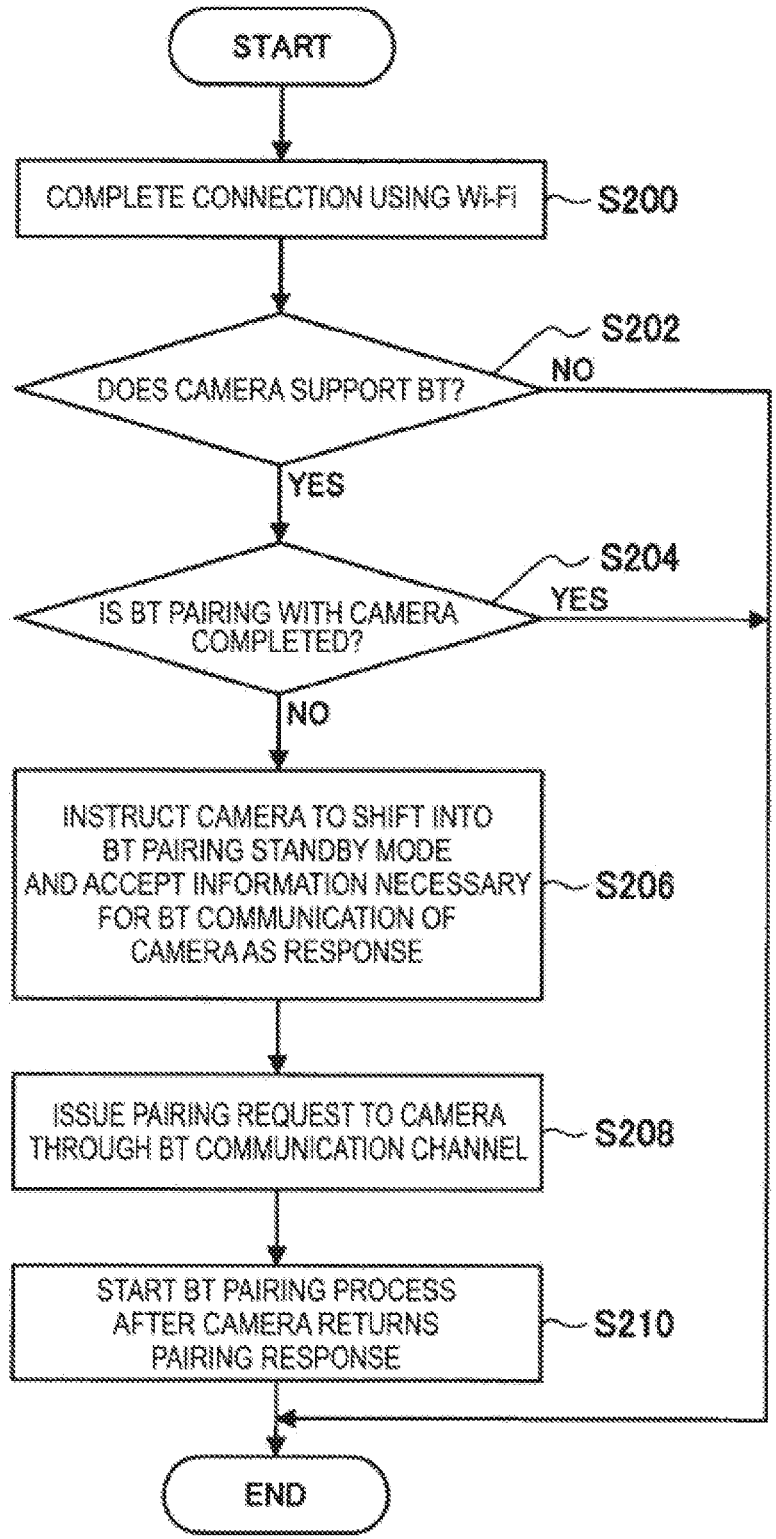

[Fig. 5]
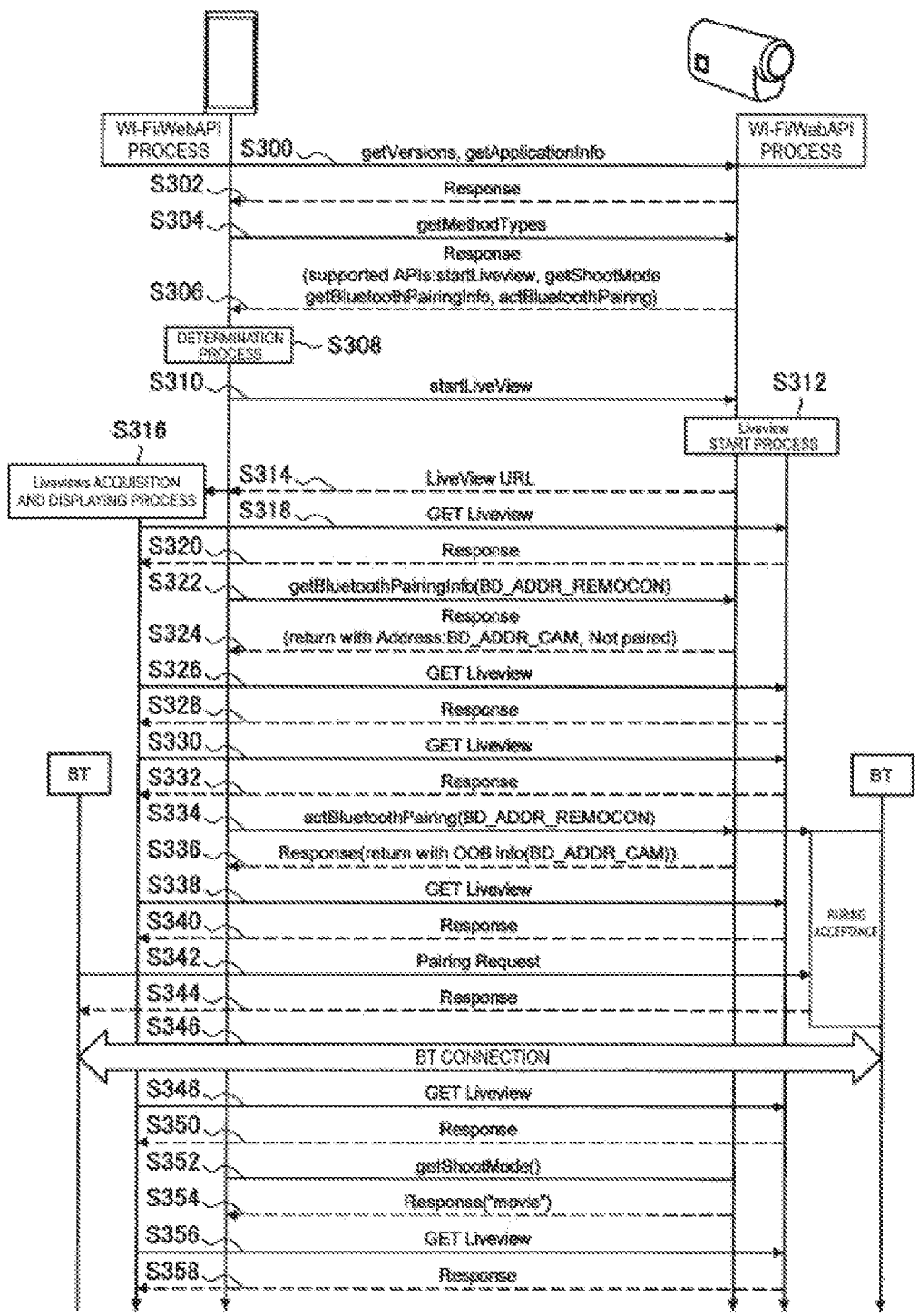

[Fig. 6]
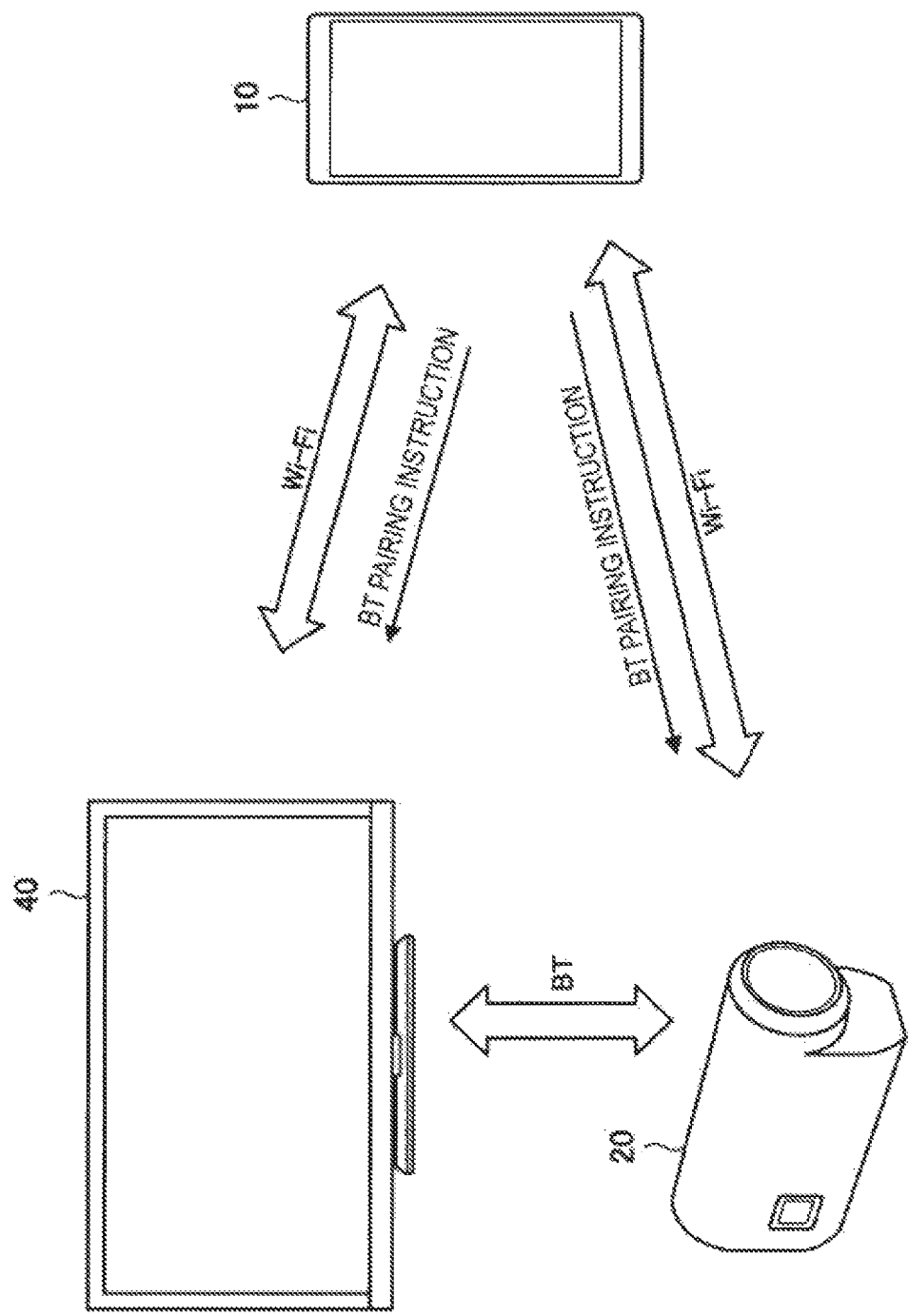

[Fig. 7]
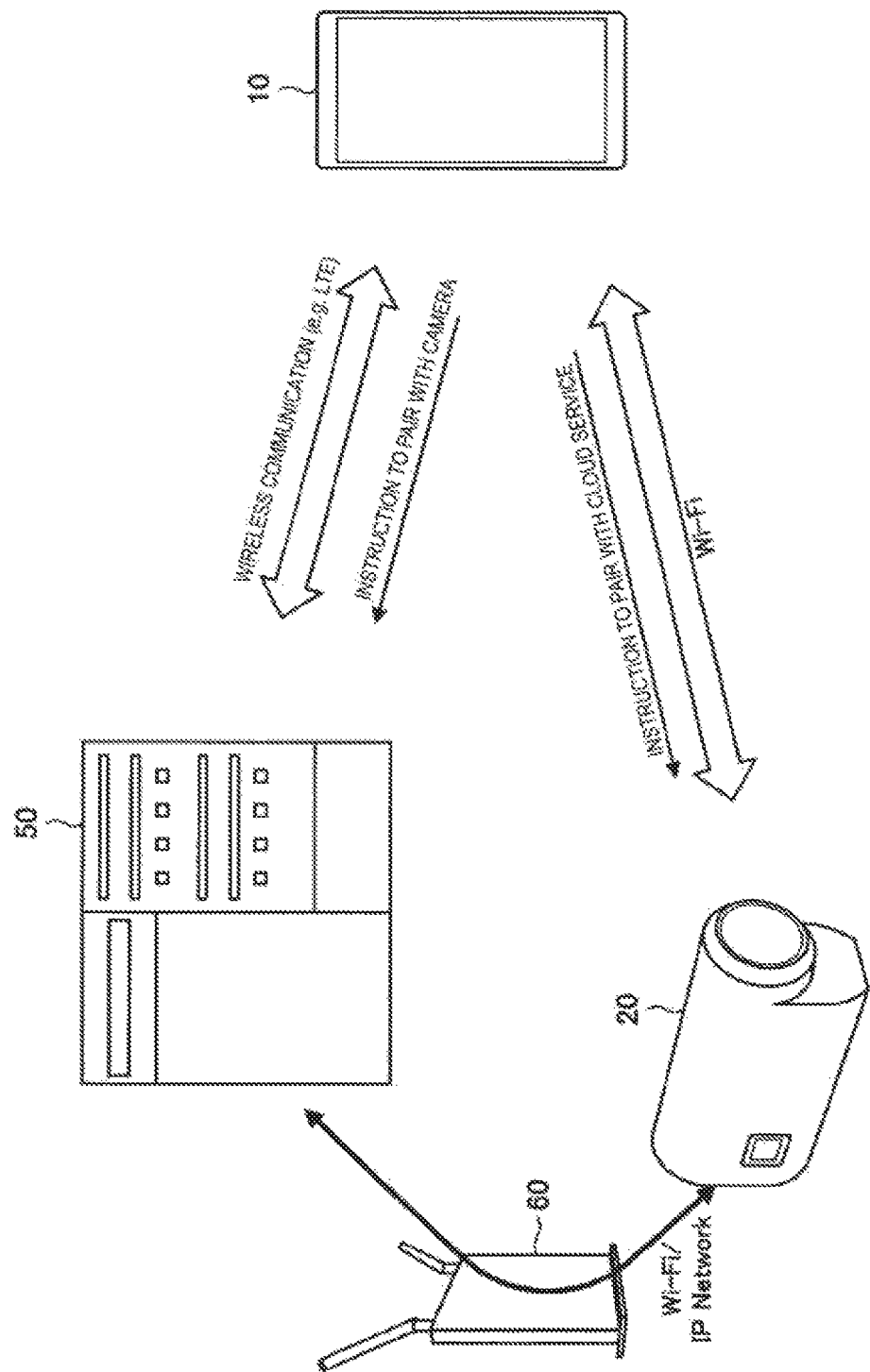

[Fig. 8]
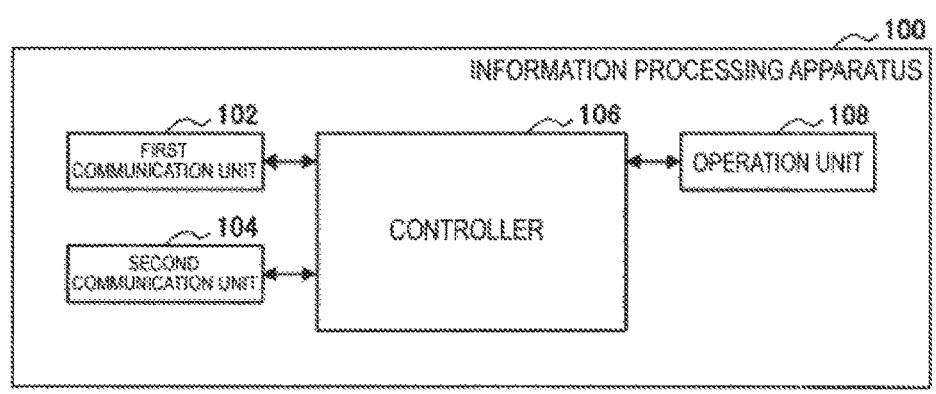

[Fig. 9]
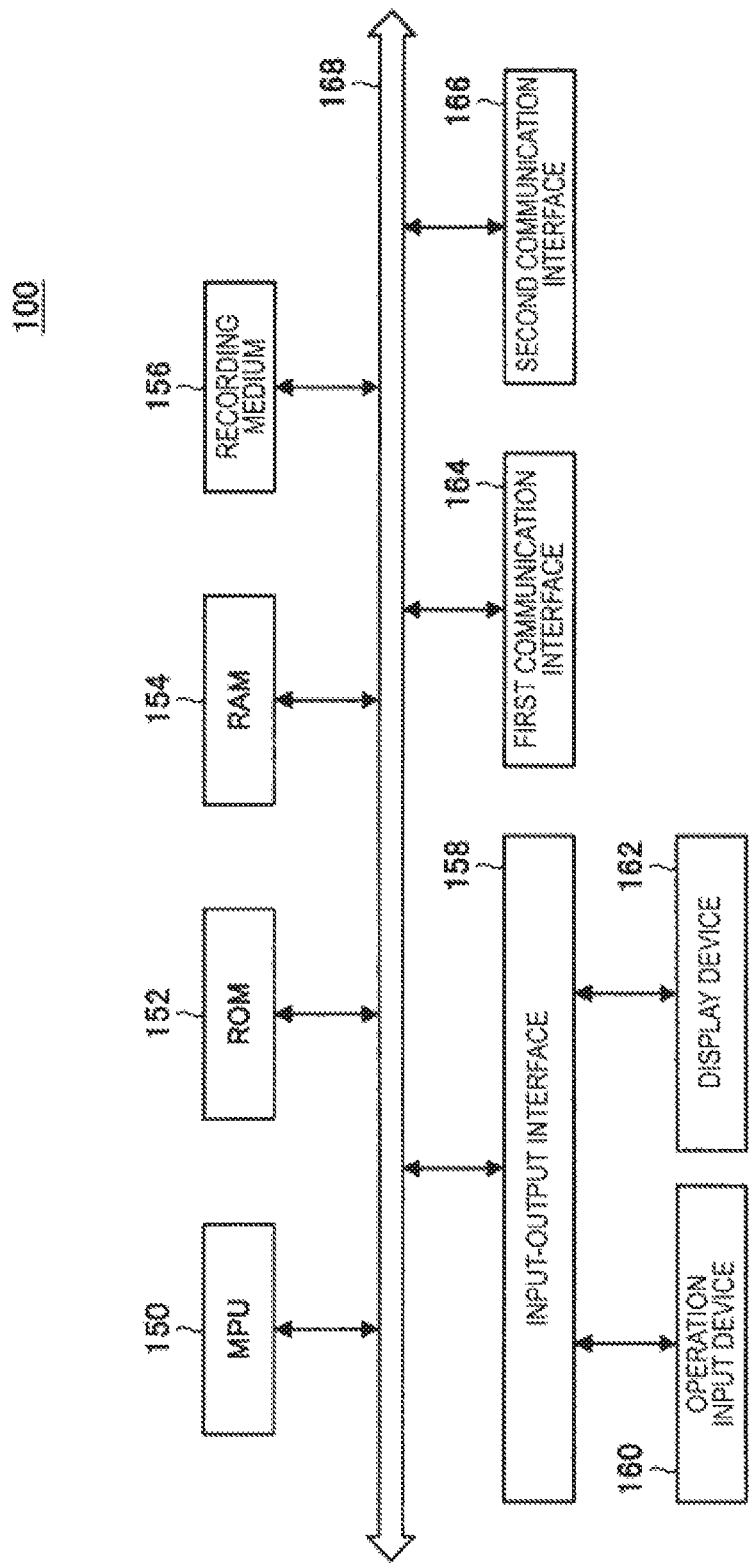

[Fig. 10]
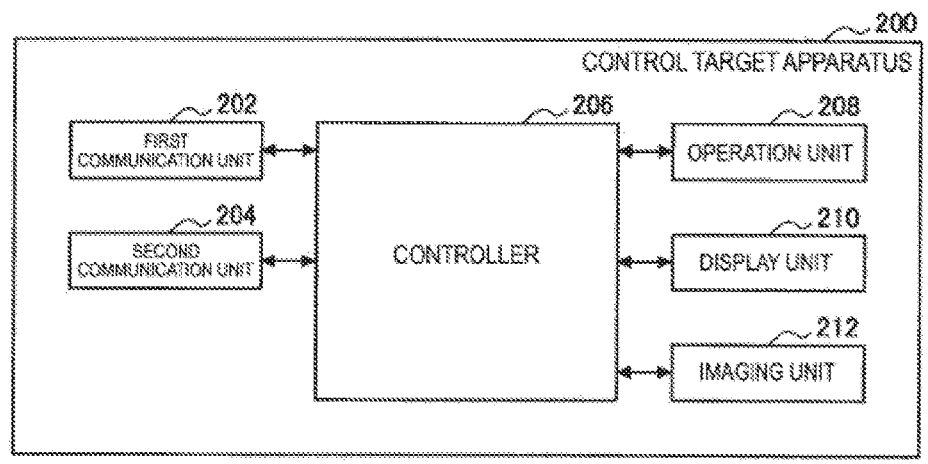

[Fig. 11]
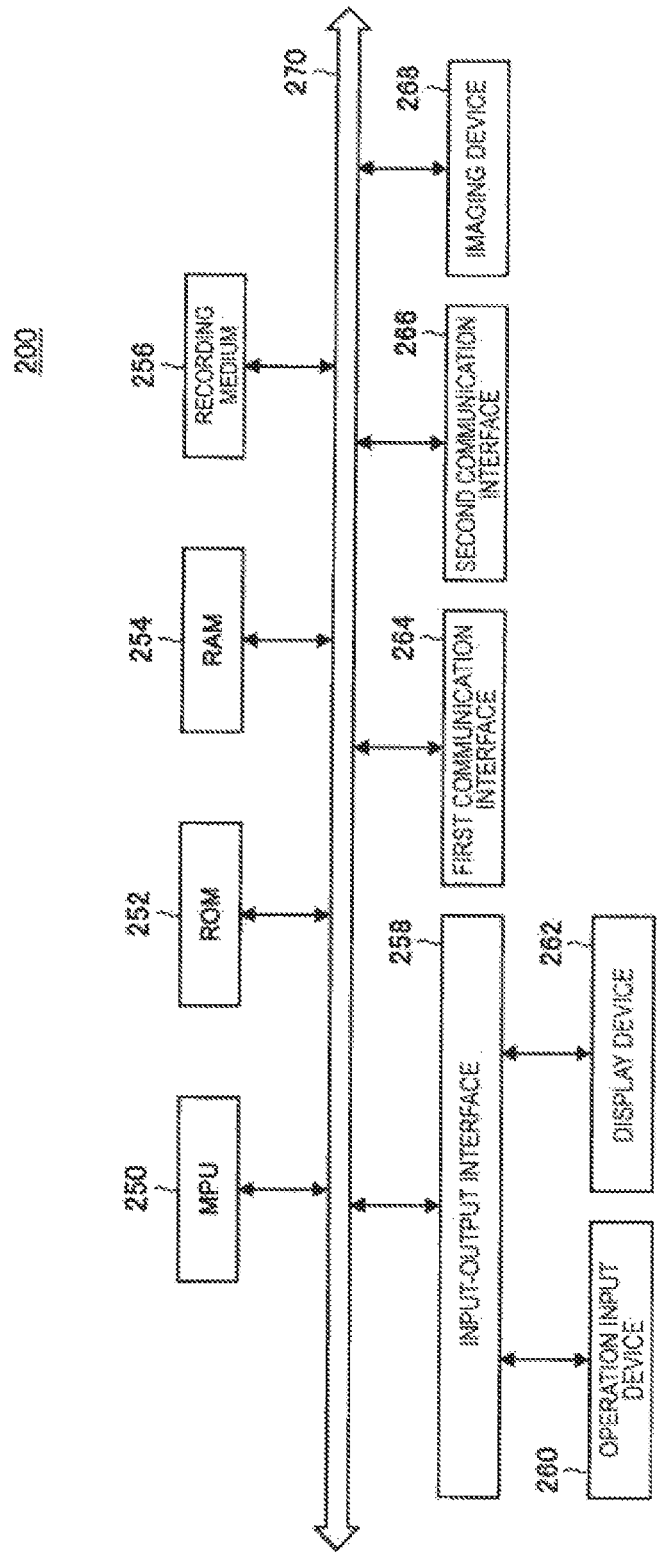

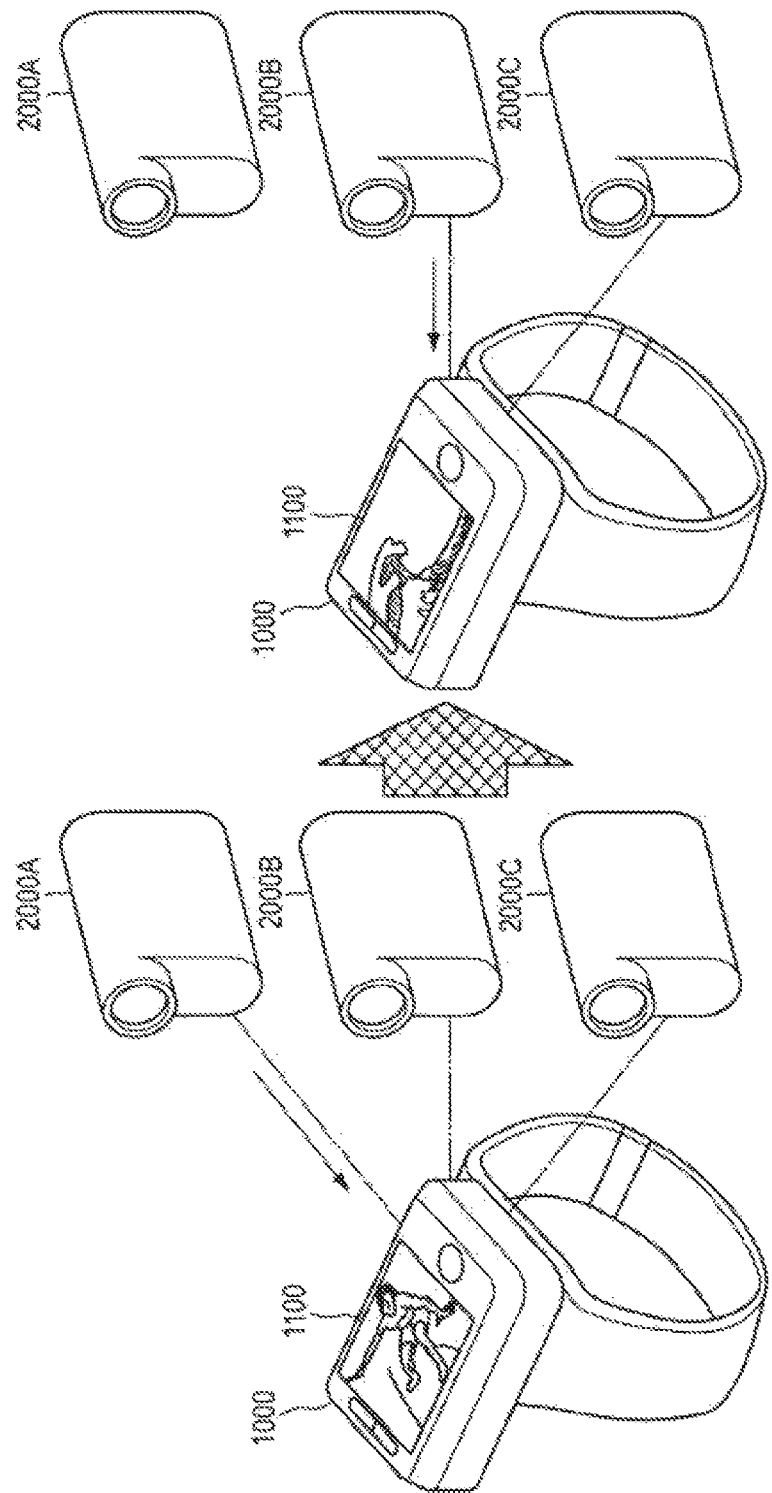
[Fig. 12]

[Fig. 13]
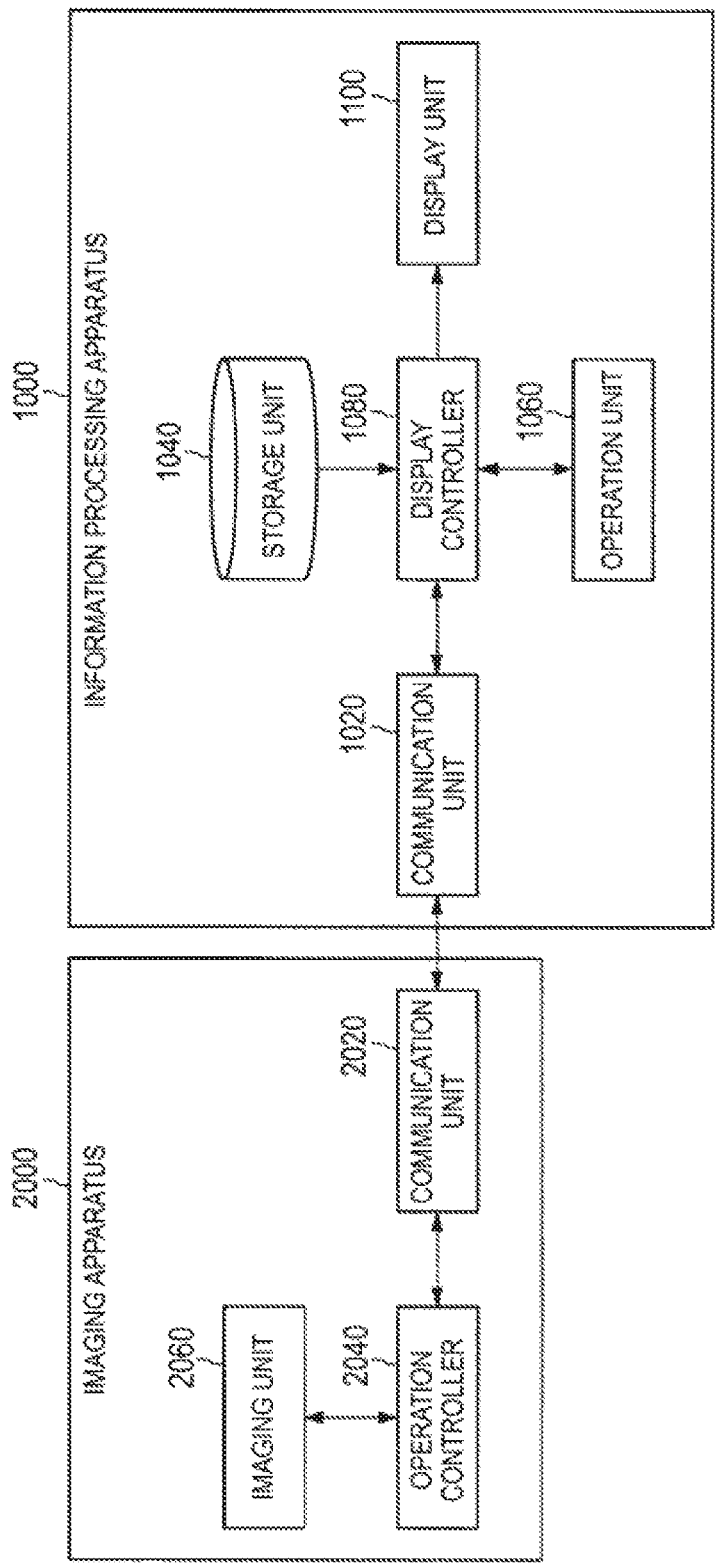

INFORMATION PROCESSING APPARATUS, INFORMATION PROCESSING METHOD, INFORMATION PROCESSING SYSTEM, AND PROGRAM

CROSS REFERENCE TO RELATED APPLICATIONS

This application claims the benefit of Japanese Priority Patent Application JP 2015-060990 filed Mar. 24, 2015, the entire contents of which are incorporated herein by reference.

TECHNICAL FIELD

The present disclosure relates to an information processing apparatus, an information processing method, an information processing system, and a program.

BACKGROUND ART

Some communication-enabled apparatuses such as mobile phones and smartphones have a function for communication using a plurality of different communication modes. Many of such communication modes may be necessary to achieve authentication between devices called pairing, for example, from the viewpoint of security. Under such circumstances, techniques for an apparatus having a function for communication using a plurality of different communication modes have been developed. An example of techniques that allow a user to have access to other devices using short-range wireless communication without determination of whether the access is permitted includes the technique disclosed in PTL 1.

CITATION LIST

Patent Literature

PTL 1: JP 2005-303947A

SUMMARY

Technical Problem

The technique disclosed in PTL 1 establishes an infrared communication channel between devices and allows each device to transmit a short-range wireless communication address assigned to its own device to the other party via the established infrared communication channel. In the technique disclosed in PTL 1, one device that receives the notification for a short-range wireless communication connection request compares a short-range wireless communication address received via the infrared communication channel with a short-range wireless communication address corresponding to another device that transmits the notification for a short-range wireless communication connection request. Then, if these addresses coincide with each other, a short-range wireless communication channel is established.

However, the technique disclosed in PTL 1 is more likely to be affected by blockage of the communication channel when using. Thus, it is desirable to provide a method of establishing a communication channel in a more convenient manner.

According to an embodiment of the present disclosure, there is provided a novel and improved information processing apparatus, information processing method, and program, which makes it possible to control communication using a plurality of different communication modes.

Solution to Problem

To solve the above problem, an information processing apparatus is disclosed comprising a control circuitry configured to control communication with another information processing apparatus using a first communication mode, control communication with the another information processing apparatus using a second communication mode, establish a first connection with the another information processing apparatus using the first communication mode and prompt the another processing apparatus to execute a process through the first connection after establishing the first connection with the another information processing apparatus but prior to completing, through the first connection, a second connection with the another information processing apparatus using the second communication mode.

Advantageous Effects of Invention

According to one or more of embodiments of the present disclosure, it is possible to control communication using a plurality of different communication modes.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 1 is a diagram illustrated to describe an information processing method according to an embodiment of the present disclosure.

FIG. 2 is a diagram illustrated to describe an exemplary process for implementing the information processing method according to an embodiment of the present disclosure.

FIG. 3 is a diagram illustrated to describe an exemplary process for implementing the information processing method according to an embodiment of the present disclosure.

FIG. 4 is a flowchart illustrating an exemplary process for implementing the information processing method according to an embodiment of the present disclosure.

FIG. 5 is a diagram illustrated to describe another example of the process for implementing the information processing method according to an embodiment of the present disclosure.

FIG. 6 is a diagram illustrated to describe an exemplary process for implementing the information processing method according to an embodiment of the present disclosure.

FIG. 7 is a diagram illustrated to describe an exemplary process for implementing the information processing method according to an embodiment of the present disclosure.

FIG. 8 is a block diagram illustrating an exemplary configuration of an information processing apparatus according to an embodiment of the present disclosure.

FIG. 9 is a diagram illustrated to describe an exemplary hardware configuration of the information processing apparatus according to an embodiment of the present disclosure.

FIG. 10 is a block diagram illustrating an exemplary configuration of a control target apparatus according to an embodiment of the present disclosure.

FIG. 11 is a diagram illustrated to describe an exemplary hardware configuration of the control target apparatus according to an embodiment of the present disclosure.

FIG. 12 is a diagram illustrated to describe an overview of an application example of the information processing apparatus according to an embodiment of the present disclosure.

FIG. 13 is a block diagram illustrating a schematic functional configuration of the information processing apparatus and the control target apparatus according to an embodiment of the present disclosure.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be given in the order of items shown below.

1. Information Processing Method according to Exemplary Embodiment
2. Information Processing Apparatus according to Exemplary Embodiment
3. Control Target Apparatus according to Exemplary Embodiment
4. Program according to Exemplary Embodiment
5. Application Example of Information Processing Apparatus and Control Target Apparatus according to Exemplary Embodiment (Information Processing Method According to Exemplary Embodiment)

An information processing method according to an embodiment of the present disclosure will be described and then the configuration of an information processing apparatus according to an embodiment of the present disclosure will be described. The information processing method according to the exemplary embodiment will be described below by taking, as an example, the case where the information processing apparatus according to the exemplary embodiment performs a process for implementing the information processing method according to the exemplary embodiment.

(1) Overview of Information Processing Method According to Exemplary Embodiment

As described above, some communication-enabled apparatuses such as mobile phones and smartphones have a function to communicate using a plurality of different communication modes.

FIG. 1 is a diagram illustrated to describe the information processing method according to the exemplary embodiment, and illustrates an example of apparatus having a function to communicate using a plurality of different communication modes. FIG. 1 illustrates an example in which a smartphone 10 and a camera 20 can communicate with each other using different communication modes, namely communication compliant to IEEE 802.11 standard (hereinafter referred to as "Wi-Fi") and communication compliant to IEEE 802.15.1 standard (also called "Bluetooth" (registered trademark), hereinafter referred to as "BT").

The plurality of different communication modes according to the exemplary embodiment are not limited to two communication modes, Wi-Fi and BT as shown in FIG. 1. Examples of the plurality of different communication modes according to the exemplary embodiment include two or more communication modes of Wi-Fi, BT, near-field communication (NFC), optical wireless communication such as infrared communication, voice communication using voice, any wireless communication such as long-term evolution (LTE), and wired communication such as local area network (LAN).

When a technique known in the art as disclosed in PLT 1 is used as described above, the apparatus having a function to communicate using a plurality of different communication modes may establish communication using one of a plurality of different communication modes. In this case, the apparatus will perform a process for establishing communication using another communication mode with a communication target apparatus regardless of whether the communication target apparatus is allowed to communicate using the other communication mode. Thus, when such a technique known in the art is employed, an external apparatus that is not allowed to communicate using a different communication mode may obtain data used for pairing, e.g., communication address of its own apparatus and data used for authentication such as personal identification number (MN) code and extended service set identifier (ESS-ID).

Thus, the information processing apparatus according to the exemplary embodiment controls (a control process) the communication using a first communication mode and the communication using a second communication mode that is different from the first communication mode.

Examples of the communication using the first communication mode according to the exemplary embodiment include Wi-Fi as shown in FIG. 1. Examples of the communication using the second communication mode according to the exemplary embodiment include BT as shown in FIG. 1.

The combination of the communication using the first communication mode and the communication using the second communication mode according to the exemplary embodiment is not limited to that of Wi-Fi and BT, and any different communication modes may be combined. Specifically, examples of the first communication mode include a non-directional wireless communication mode. As the first communication mode, in addition to Wi-Fi, mobile telecommunication such as 3G may be used, or even BT (in case of using communication mode other than BT as the second communication mode) may be used. The non-directional wireless communication mode indicates that actual antenna characteristics of equipment may not be necessarily non-directional, but it is sufficient that propagating electromagnetic waves are used in a wireless communication mode. For example, the non-directional wireless communication mode does not indicate the communication intended to operate over short distances (short-range wireless communication), e.g., 10 centimeters, such as NFC, or the communication intended to have sharp directivity such as infrared.

The case where the communication using the first communication mode according to the exemplary embodiment is Wi-Fi and the communication using the second communication mode according to the exemplary embodiment is BT will be described below as an example. The communication using the first communication mode according to the exemplary embodiment may be communication using a communication mode, such as Wi-Fi, capable of maintaining the state in which the communication is established even if the distance between apparatuses is greater than or equal 1 meter. In this case, the maintenance of a state capable of communication using the first communication mode allows various processes employing the communication using the first communication mode to be implemented.

More specifically, the information processing apparatus according to the exemplary embodiment, when it establishes communication using the first communication mode with a control target apparatus, acquires communication-related information and control information from the control target apparatus. The communication-related information indicates whether the control target apparatus is allowed to communicate using the second communication mode, and control information is related to a process executable by the control target apparatus. The term "acquisition of information" as used herein may refer to a process, including acquisition of information being received as a response to the request including an information transmission instruction that is actively transmitted to the control target apparatus or other external apparatuses, acquisition of information being passively received from the control target apparatus or other devices, acceptance of received information as data input, and reading out information from a recording medium and other machine-readable device. This request and information transmission or reception are performed through a communication device provided in the information processing apparatus according to the exemplary embodiment or a communication device connected to the information processing apparatus according to the exemplary embodiment. The information relating to communication indicating whether a control target apparatus is allowed to communicate using the second communication mode is referred to as "communication-related information" hereinafter.

The information processing apparatus according to the exemplary embodiment may transmit one or more transmission instructions, which are used to transmit the communication-related information and the control information, to the control target apparatus through the communication using the first communication mode. This transmission allows the information processing apparatus to acquire the communication-related information and the control information from the control target apparatus. The communication using the first communication mode between the information processing apparatus according to the exemplary embodiment and the control target apparatus is performed through a communication device using the first communication mode provided in each of the information processing apparatus and the control target apparatus, or is performed through an external communication device using the first communication mode connected to each apparatus.

Examples of the control target apparatus according to the exemplary embodiment include an external apparatus of the information processing apparatus according to the exemplary embodiment. For example, taking FIG. 1 as an example, when the smartphone 10 is the information processing apparatus according to the exemplary embodiment, the camera 20 may be an external apparatus of the information processing apparatus according to the exemplary embodiment and is regarded as the control target apparatus. In the example shown in FIG. 1, when the camera 20 is the information processing apparatus according to the exemplary embodiment, the smartphone 10 may be an external apparatus of the information processing apparatus according to the exemplary embodiment and is regarded as the control target apparatus.

Examples of the communication-related information according to the exemplary embodiment include data indicating that the second communication mode is supported. For example, when the communication using the second communication mode is BT, information including "getBluetoothPairing" or "actBluetoothPairing", which is acquired from the control target apparatus and is allowed to be included in an application programming interface (API) that can be processed by the control target apparatus, corresponds to an example of data indicating that the second communication mode is supported.

The information "getBluetoothPairingInfo" corresponds to an example of "information indicating whether the control target apparatus is allowed to process a connection establishment completion confirmation request used to request information indicating whether the connection establishment using the second communication mode is completed in the control target apparatus". In other words, examples of the communication-related information according to the exemplary embodiment include "information indicating whether the control target apparatus is allowed to process a connection establishment completion confirmation request used to request information indicating whether the connection establishment using the second communication mode is completed in the control target apparatus", such as information "getBluetoothPairingInfo" as described above.

The information "actBluetoothPairing" described above corresponds to an example of information indicating whether the control target apparatus is allowed to process a connection request (described later) through the communication using the first communication mode. In other words, examples of the communication-related information according to the exemplary embodiment include information indicating whether the control target apparatus is allowed to process a connection request (described later) through the communication using the first communication mode, such as "actBlue-toothPairing" as described above.

The communication-related information according to the exemplary embodiment is not limited to the example described above. For example, the communication-related information according to the exemplary embodiment may be a flag that indicates whether the second communication mode is supported. The communication-related information according to the exemplary embodiment, when it can be used in determining whether the second communication mode is supported, may be information indicating a known type of device ID or model name of a product.

Examples of the control information according to the exemplary embodiment include data indicating a process executable by the control target apparatus. For example, when the control target apparatus is the camera 20 shown in FIG. 1, data, which is acquired from the control target apparatus and indicates API that can be processed by the control target apparatus (e.g., "startLiveView" or "getShootMode", described later), corresponds to an example of data indicating a process executable by the control target apparatus. The control information according to the exemplary embodiment, when it can be used in determining a process executable by the control target apparatus, may be information indicating a known type of unique device ID or model name of a product.

The information processing apparatus according to the exemplary embodiment transmits a connection request used to establish communication using the second communication mode to the control target apparatus based on the communication-related information.

The information processing apparatus according to the exemplary embodiment may determine whether the control target apparatus is allowed to communicate using the second communication mode based on the communication-related information. If it is determined that the communication using the second communication mode is possible, the information processing apparatus according to the exemplary embodiment transmits a connection request to the control target apparatus.

The information processing apparatus according to the exemplary embodiment, for example when it acquires data indicating that the second communication mode is supported (an example of the communication-related information), determines that the control target apparatus is allowed to communicate using the second communication mode.

The control target apparatus may determine whether an apparatus to be communicating with the control target apparatus using the second communication mode is in a state of being allowed to communicate using the second communication mode. This allows the information processing apparatus to determine whether the control target apparatus is allowed to communicate using the second communication mode. In some cases, the apparatus to be communicating with the control target apparatus using the second communication mode may be referred to as "communication target apparatus" hereinafter.

The communication target apparatus may be in a predetermined state, for example, the case where a main power of the communication target apparatus is determined to be OFF or is determined to be in a busy state for some reason in this case, the information processing apparatus according to the exemplary embodiment does not determine that the communication target apparatus is in a state of being allowed to communicate using the second communication mode.

Examples of the connection request according to the exemplary embodiment include data that contains an instruction to perform the communication using the second communication mode such as BT.

The connection request according to the exemplary embodiment may include data (e.g., address data) relating to a communication target (communication target apparatus) to be communicating with the control target apparatus using the second communication mode. Examples of the communication target that establishes communication with the control target apparatus using the second communication mode include "information processing apparatus according to the exemplary embodiment" and "other control target apparatuses" that are external apparatuses of the control target apparatus.

When the connection request according to the exemplary embodiment contains data relating to a communication target, the connection request according to the exemplary embodiment corresponds to a "request to establish communication using the second communication mode between the information processing apparatus and the control target apparatus", or "request to establish communication using the second communication mode between the control target apparatus (the first control target apparatus) and another control target apparatus (the second control target apparatus)" different from the control target apparatus.

The control target apparatus, when it receives a connection request, starts a process for establishing communication using the second communication mode according to the connection request, including a pairing process and other like processes. When the control target apparatus and a communication target are ready to communicate with each other using the second communication mode, the control target apparatus may not be necessary to perform a process for establishing communication using the second communication mode.

As an example, when a communication target that establishes communication with the control target apparatus using the second communication mode is the information processing apparatus according to the exemplary embodiment, the communication using the second communication mode is achieved between the information processing apparatus and the control target apparatus. When a communication target that establishes communication with the control target apparatus using the second communication mode is another control target apparatus, the communication using the second communication mode is achieved between the control target apparatus (the first control target apparatus) and the other control target apparatus (the second control target apparatus) different from the control target apparatus.

Thus, the transmission of the connection request allows the communication using the second communication mode to be controlled in the control target apparatus.

The information processing apparatus according to the exemplary embodiment transmits a process execution request, which is used to allow the control target apparatus to perform a process executable by the control target apparatus, to the control target apparatus based on the control information. Examples of the process execution request according to the exemplary embodiment include data that contains a processing instruction used to execute one or more of processes executable by the control target apparatus indicated by the control information.

The information processing apparatus according to the exemplary embodiment may transmit the process execution request through the communication established using the first communication mode as described above.

A communication target that establishes communication with the control target apparatus using the second communication mode may be the information processing apparatus according to the exemplary embodiment. In this case, the process execution request is transmitted through the communication using the second communication mode established between the control target apparatus and the communication target acting as the information processing apparatus according to the exemplary embodiment. The communication using the second communication mode between the control target apparatus and the information processing apparatus according to the exemplary embodiment may be performed through a communication device for the second communication mode provided in each apparatus or an external communication device for the second communication mode connected to each apparatus.

The information processing apparatus according to the exemplary embodiment controls communication using a plurality of different communication modes by performing the control process as described above.

When the control target apparatus establishes communication using the first communication mode while a communication target apparatus is allowed to communicate using the second communication mode, the control process as described above allows the control target apparatus to communicate with the communication target apparatus using the second communication mode.

Thus, the control process performed as described above by the information processing apparatus according to the exemplary embodiment can prevent an external apparatus that is not allowed to communicate using the second communication mode from acquiring data to be used for pairing as described above.

The information processing apparatus according to the exemplary embodiment can communicate with the control target apparatus using the first communication mode before the control target apparatus establishes communication using the second communication mode, and thus it is possible to transmit the process execution request to the control target apparatus. Thus, the information processing apparatus according to the exemplary embodiment may cause the control target apparatus to perform an executable process, for example, before the communication using the second communication mode is established in the control target apparatus. The information processing apparatus according to the exemplary embodiment may allow the control target apparatus to perform in parallel a process for establishing communication using the second communication mode and a process for executing the process executable by the control target apparatus.

The information processing apparatus according to the exemplary embodiment can transmit the process execution request to the control target apparatus, for example, even after the communication using the second communication mode is established in the control target apparatus. In this case, the communication may be performed through the communication using the first communication mode or the second communication mode between the information processing apparatus and the control target apparatus. Thus, the information processing apparatus according to the exemplary embodiment may allow the control target apparatus to perform an executable process, for example, even after the communication using the second communication mode is established in the control target apparatus.

The process for implementing the information processing method according to the exemplary embodiment will be described in detail.

(2) Exemplary Process for Implementing Information Processing Method According to Exemplary Embodiment The information processing apparatus according to the exemplary embodiment controls communication in the control target apparatus (the control process).

As described above, the information processing apparatus according to the exemplary embodiment, when it establishes communication with the control target apparatus using the first communication mode, acquires the communication-related information and the control information. The information processing apparatus according to the exemplary embodiment transmits the connection request to the control target apparatus based on the communication-related information. The information processing apparatus according to the exemplary embodiment transmits the process execution request used to to perform a process executable by the control target apparatus to the control target apparatus based on the control information.

The information processing apparatus according to the exemplary embodiment determines whether the control target apparatus is allowed to communicate using the second communication mode, for example, based on the communication-related information. If it is determined that the communicate using the second communication mode is possible, the information processing apparatus according to the exemplary embodiment transmits the connection request to the control target apparatus.

The process performed in the case where it is determined that the control target apparatus is allowed to communicate using the second communication mode is not limited to the above example.

As an example, when the control target apparatus and a communication target apparatus are in a state where they are ready to communicate with each other using the second communication mode, the information processing apparatus according to the exemplary embodiment does not transmit the connection request to the control target apparatus. Each of the control target apparatus and the communication target apparatus may have data related to pairing for communication using the second communication mode between the control target apparatus and the communication target apparatus. In this case, the information processing apparatus according to the exemplary embodiment determines that the control target apparatus and the communication target apparatus are in a state where they are ready to communicate with each other using the second communication mode.

When it is determined that the communication using the second communication mode is possible, the information processing apparatus according to the exemplary embodiment can selectively transmit the connection request based on at least one of the states of the control target apparatus and the communication target apparatus. In addition, the information processing apparatus allows the control target apparatus to selectively communicate with the communication target apparatus using the second communication mode based on at least one of the states of the control target apparatus and the communication target apparatus.

As an example, the description will be given of a case where the information processing apparatus according to the exemplary embodiment is the smartphone 10 shown in FIG. 1, the control target apparatus is the camera 20 shown in FIG. 1, and each of the information processing apparatus according to the exemplary embodiment and the control target apparatus is allowed to communicate using either "Wi-Fi" or "BT". As an example, the information processing apparatus according to the exemplary embodiment may be a live-view remote controller as shown in FIG. 12, which will be described later. Each of the information processing apparatus according to the exemplary embodiment and the control target apparatus can employ "Bluetooth (registered trademark) low energy" as BT, for example. In the above example, the information processing apparatus according to the exemplary embodiment is an apparatus to be communicating with the control target apparatus using the second communication mode, that is, the communication target apparatus.

Wi-Fi offers advantages as described below, for example.
Wide bandwidth allowing communication with large amount of data
Use of 5 GHz band with highly resistant to interference depending on standards to avoid congestion in countries or regions employing 2.4 GHz band
BLE offers advantages as described below, for example.
Power saving
Communication using frequency hopping allowing high resistance to jamming A case where the smartphone 10 is operated to activate the camera 20, that is, the smartphone 10 serves as a remote controller to operate the camera 20 is assumed.

When the smartphone 10 serves as a remote controller to operate the camera 20, the smartphone 10 controls the behavior of the camera 20, for example, using API. More specifically, the smartphone 10 transmits the control information (data) to the camera 20 to control the behavior of the camera 20. The control information according to the exemplary embodiment may include one or more of an image capturing instruction, an instruction to transmit a through-the-lens image (so-called live view) to the smartphone 10, an instruction to transmit data indicating the settings of the camera 20 to the smartphone 10, and an instruction to change the settings of the camera 20.

As described above, the operation of the smartphone 10 allows the behavior of the camera 20 to be controlled, and thus it is possible to extend the range to which the camera 20 is applicable. As an example, the camera 20 may be a small, lightweight, and strong (e.g., waterproof, dustproof, shockproof, and even freeze-proof) imaging apparatus so that it is possible to shoot a scene with sense of reality during sports in hands-tree mode while being mounted to a helmet and other tools during sports (e.g., cycling, running, snowboarding, skiing, driving, surfing, and diving). The camera 20 that is applicable to sports as described above allows an operation device or a display device to be simplified or eliminated by reducing the size and weight of the camera. Thus, operations of the camera 20 including the imaging control or setting change of the camera 20 are assumed to be performed by an external apparatus such as the smartphone 10 that serves as a remote controller. The camera 20 may have a housing that is capable of being fixed to a moving object such as humans and vehicles or to an object such as information processing terminal by being mounted to the housing itself or using external attachments not shown. The camera 20 may be configured as a wearable camera that can be mounted on the body of the user.

For example, when a through-the-lens image (so-called live view) of the camera 20 is displayed on a display screen of the smartphone 10, it is desirable to communicate using rather than BLE to achieve shorter communication time in view of the amount of data. On the other hand, for example, when the camera 20 is intended to switch the main power from OFF state (i.e., standby state) to ON state through the communication from the smartphone 10, it is desirable to communicate using BLE rather than Wi-Fi in view of power saving.

In the example shown in FIG. 1, the information processing apparatus according to the exemplary embodiment that is the smartphone 10 determines a communication mode to be used for communication between a control target apparatus and the information processing apparatus according to the exemplary embodiment that is a communication target apparatus. This determination may be performed on the basis of the state of the camera 20 (an example of the state of the control target apparatus).

The information processing apparatus according to the exemplary embodiment can also determine a communication mode based on the states of the camera 20 and the smartphone 10, that is, the combination of the state of the control target apparatus and the state of the communication target apparatus. The information processing apparatus according to the exemplary embodiment may determine a communication mode corresponding to at least one of the states of the control target apparatus and the communication target apparatus by reference to a table (or database) formed by associating at least one of the states of the control target apparatus and the communication target apparatus with the communication modes.

The information processing apparatus according to the exemplary embodiment may perform, for example, the process described above as the control process, and thus the communication using the first communication mode and the communication using the second communication mode different from the first communication mode are controlled.

The information processing apparatus according to the exemplary embodiment, when it determines that the control target apparatus is allowed to communicate using the second communication mode, transmits the connection request to the control target apparatus.

The information processing apparatus according to the exemplary embodiment may perform, for example, the process described above as the control process, and thus it is possible to prevent data used for pairing as described above from being acquired by an external apparatus that is not allowed to communicate using the second communication mode. The process as described above performed as the control process enables a process of establishing unnecessary communication or its communication to be prevented from being performed, resulting in the reduction in the power consumed by at least one of the control target apparatus and the communication target apparatus.

The information processing apparatus according to the exemplary embodiment can transmit the process execution request to the control target apparatus, for example, before the communication using the second communication mode is established in the control target apparatus or after the communication using the second communication mode is established in the control target apparatus. Thus, the control target apparatus can perform an executable process based on the process execution request regardless of whether the communication using the second communication mode is established, leading to improvement of the user convenience in operating the control target apparatus.

The information processing apparatus according to the exemplary embodiment performing, for example, the process described above as the control process offers advantageous effects as described below.

Users can perform pairing between apparatuses having a function to communicate using a plurality of different communication modes to achieve communication using two or more communication modes by carrying out the operation for pairing once without depending on the protocol to be used.

More secure pairing mechanism is achievable than that with the use of the existing NFC Handover such as existing NFC Bluetooth (registered trademark).

Pairing between apparatuses is controllable by an apparatus other than the control target apparatus serving as an external apparatus of the information processing apparatus according to the exemplary embodiment.

The process for implementing the information processing method according to the exemplary embodiment is not limited to the example described above.

For example, in an information processing system to which the process for implementing the information processing method according to the exemplary embodiment is applicable, the control target apparatus may perform a process related to authentication using identification information such as a matching process using identification information.

Examples of the identification information according to the exemplary embodiment include any type of data capable of specifying an apparatus, e.g., address information (data) indicating an address of an apparatus and data used for authentication such as personal identification number (PIN) code and extended service set identifier (ESS-ID).

FIG. 2 is a diagram illustrated to describe an exemplary process for implementing the information processing method according to the exemplary embodiment. The portions A and B of FIG. 2 illustrate an example of communication achieved by the process for implementing the information processing method according to the exemplary embodiment. The portions A and B of FIG. 2 illustrate an example of communication achieved when the communication over BT is established between the smartphone 10 and the camera 20. In this case, the smartphone 10 serves as the information processing apparatus according to the exemplary embodiment and also serves as the control target apparatus, and the camera 20 serves as a communication target apparatus.

When the process for implementing the information processing method according to the exemplary embodiment is performed, the smartphone 10 transmits the connection request using BT to the camera 20 by using the established Wi-Fi connection (an example of the first communication mode) as shown in the portions A and B of FIG. 2. The connection request transmitted from the smartphone 10 to the camera 20 includes address information (an example of identification information) of the smartphone 10. The connection request transmitted from the smartphone 10 to the camera 20 may be performed, for example, by employing a command issuing protocol called Web API. It will be understood that the transmission of the connection request from the smartphone 10 to the camera 20 is not limited to the use of Web API.

The communication over Wi-Fi between the smartphone 10 and the camera 20 allows data (connection information shown in the portion B of FIG. 2) that is necessary to establish the communication over BT (an example of the second communication mode) to be transmitted or received. Then, the camera 20 accepts the pairing over BT.

When the process for implementing the information processing method according to the exemplary embodiment is performed, the smartphone 10 automatically transmit a pairing request if it is allowed to communicate using BT (an example of the second communication mode), without necessity for the user to perform a separate operation for establishing the communication over BT.

The camera 20, when it acquires the pairing request, performs a matching process using the address information of the smartphone 10. If an address included in the pairing request matches an address indicated by the address information of the smartphone 10, the camera 20 performs the pairing.

Thus, as shown in the portion A of FIG. 2, when the camera 20 acquires the pairing request from the smartphone 10 and an address included in the pairing request matches an address indicated by the address information of the smartphone 10, the pairing over BT is performed between the smartphone 10 and the camera 20.

As shown in the portion B of FIG. 2, the pairing request may be transmitted from a smartphone 30 (an example of an apparatus other than the smartphone 10) other than the smartphone 10 to the camera 20 before the smartphone 10 transmit the pairing request. In this case, the address indicated by the address information of the smartphone 10 is different from an address of the smartphone 30, and thus the camera 20 does not perform the pairing with the smartphone 30. As shown in the portion B of FIG. 2, when the camera 20 acquires the pairing request from the smartphone 10, the address included in the pairing request matches the address indicated by the address information of the smartphone 10. Thus, the camera 20 performs the pairing over BT with the smartphone 10.

Consequently, the control target apparatus can perform the process related to authentication using the identification information as described above, and thus it is possible to prevent the communication using the second communication mode from being performed between unintended apparatuses, in other words, the process related to authentication using the identification information as described above can be performed in the control target apparatus, and thus it is possible to prevent attacks, for example, including unauthorized access by a malicious third party.

The information processing apparatus according to the exemplary embodiment performs the control process described above as the process for implementing the information processing method according to the exemplary embodiment.

Note that the above control process may be a part of the process for implementing the information processing method according to the exemplary embodiment for the sake of simplicity. Thus, the process for implementing the information processing method according to the exemplary embodiment may be regarded as two or more processes constituting (using any separation method) the above-mentioned control process.

(3) Exemplary Specific Process for Implementing Information Processing Method According to Exemplary Embodiment The description will be given of an "exemplary process performed in a case where the connection request is a request used to establish the communication using the second communication mode between the information processing apparatus according to the exemplary embodiment and the control target apparatus" as a specific example of the process for implementing the information processing method according to the exemplary embodiment. The description also will be given of an "exemplary process performed in a case the connection request is a request used to establish the communication using the second communication mode between the control target apparatus (the first control target apparatus) and another control target apparatus (the second control target apparatus)" different from the control target apparatus, as a specific example of the process for implementing the information processing method according to the exemplary embodiment.

(3-1) First Example of Process for implementing Information Processing Method according to Exemplary Embodiment: an exemplary process performed in a case where the connection request is a request used to establish the communication using the second communication mode between the information processing apparatus according to the exemplary embodiment and the control target apparatus The description will be given of an exemplary process performed in a case where the connection request is a request used to establish the communication using the second communication mode between the information processing apparatus according to the exemplary embodiment and the control target apparatus. The description will be given of an example where the information processing apparatus according to the exemplary embodiment is the smartphone 10 shown in FIG. 1 and the control target apparatus is the camera 20 shown in FIG. 1.

FIG. 3 is a diagram illustrated to describe an exemplary process for implementing the information processing method according to the exemplary embodiment. FIG. 3 illustrates an example where the communication procedures in steps S100 to S106 and S110 to S116 are performed by using Wi-Fi and the communication procedures in steps S118 and S120 are performed by using BT.

The communication over Wi-Fi is established between the smartphone 10 serving as the information processing apparatus according to the exemplary embodiment and the camera 20, and then the smartphone 10 transmits a device discovery command to device in the established network by multicast. The camera 20 that has a service corresponding to the device discovery command transmits a response command to the smartphone 10. This procedure allows the smartphone 10 to specify the camera 20 serving as a communication opposite party. Then, the information processing apparatus according to the exemplary embodiment acquires data from the camera 20 by using the Web API (S100 to S106).

The communication over Wi-Fi between the smartphone 10 serving as the information processing apparatus according to the exemplary embodiment and the camera 20 serving as the control target apparatus may be established, for example, by entering the user's personal password or by using Wi-Fi Protected Setup. For example, an NFC mode may be used in Wi-Fi Protected Setup (an example of a case where the first communication mode is established using short-range wireless communication technology). In this case, the communication over NFC between the information processing apparatus according to the exemplary embodiment and the camera 20 allows data used to establish the communication over Wi-Fi to be transmitted or received, and thus the communication over Wi-Fi is established. For example, the camera 20 transmits information necessary for the Wi-Fi connection (e.g., SSID or password of Wi-Fi) to the information processing apparatus according to the exemplary embodiment through the communication over NFC. The information processing apparatus according to the exemplary embodiment performs communication for establishing the Wi-Fi connection with the camera 20 using the received information, resulting in establishment of the communication over Wi-Fi. The communication over NFC between the information processing apparatus according to the exemplary embodiment and the camera 20 may be implemented by allowing one of them to be served as a reader-writer (interrogator) in communication over NFC and the other to be served as a responder in communication over NFC.

As described above, for example, the communication over may be established between the information processing apparatus according to the exemplary embodiment and the camera 20 through the communication over NFC. In this case, the user just performs a simple operation such as a touch operation for the communication over NFC (e.g., the operation used to move at least one of the information processing apparatus according to the exemplary embodiment and the camera 20 to the position capable of communication over NFC). This enables the smartphone 10 serving as the information processing apparatus according to the exemplary embodiment and the camera 20 to perform the communication over BT. Thus, when the communication over Wi-Fi may be established between the information processing apparatus according to the exemplary embodiment and the camera 20 through the communication over NFC, it is possible to further improve the user's convenience. Although the above has been described by taking NFC as an example, it will be understood that any short-range wireless connection method other than NFC may be available.

As a more specific example, the information processing apparatus according to the exemplary embodiment automatically issues getVersions or getApplicationInfo (S100). The camera 20 transmits data relating to the version or application as a response to getVersions and other commands, and the information processing apparatus according to the exemplary embodiment acquires data relating to the version or application (S102). The information processing apparatus according to the exemplary embodiment may issue, for example, getMethodTypes (S104). The camera 20 transmits API information that can be processed by the camera 20 as a response to the getMethodTypes (S106). Examples of the API information that can be processed by the camera 20 according to the exemplary embodiment include data indicating a list of APIs supported by the camera 20.

The getMethodTypes transmitted in step S104 of FIG. 3 corresponds to an example of the transmission instruction used to transmit the communication-related information according to the exemplary embodiment. When the camera 20 supports BT, the API information acquired in step S106 may include "getBluetoothPairigInfo" or "actBlue-toothPairing" that is an example of communication-related information.

The information processing apparatus according to the exemplary embodiment may determine whether the camera 20 supports BT (S108). The process described in step S108 may correspond to the process of determining whether the camera 20 serving as the control target apparatus supports the second communication mode. For example, if the API information acquired from the camera 20 includes "getBluetoothPairigInfo" or "actBluetoothPairing", the information processing apparatus according to the exemplary embodiment determines that the camera 20 supports BT.

If it is not determined in step S108 that the camera 20 supports BT, the information processing apparatus according to the exemplary embodiment does not perform the process of establishing the communication over BT with the camera 20.

If it is determined in step S108 that the camera 20 supports BT, the information processing apparatus according to the exemplary embodiment acquires data from the camera 20 (S110 and S112). The information processing apparatus according to the exemplary embodiment issues, for example, getBluetoothPairingInfo (BD_ADDR_REMOCON) (S110), and acquires data relating to a BT pairing state transmitted as a response from the camera 20 (S112). The BD_ADDR_REMOCON is a Bluetooth (registered trademark) Device Address in the information processing apparatus according to the exemplary embodiment. The Bluetooth (registered trademark) Device Address in the information processing apparatus according to the exemplary embodiment is referred to as "BD_ADDR_REMOCON" hereinafter. Moreover, the transmission of "BD_ADDR_REMOCON" corresponds to an example of the transmission of the identification information of the information processing apparatus according to the exemplary embodiment. The information indicating the BT pairing state includes a Bluetooth (registered trademark) Address (hereinafter, referred to as "BD_ADDR_CAM") of the camera 20 and information indicating whether the execution of BT pairing with the smartphone 10 having BD_ADDR_REMOCON included in the issued getBluetoothPairingInfo (BD_ADDR_REMOCON) is completed. Examples of the information indicating whether the execution of BT pairing is completed include data that indicates "Paired" (indicating that execution of pairing is completed) or "Not paired" (indicating that execution of pairing is not completed).

The information processing apparatus according to the exemplary embodiment transmits an instruction to shift its mode into a BT pairing standby mode through the communication over Wi-Fi by using the Web API (S114).

More specifically, the information processing apparatus according to the exemplary embodiment may issue actBluetoothPairing (BD_ADDR_REMOCON) and shifts the camera 20 into the BT pairing standby mode. When the camera 20 receives actBlue-toothPairing (BD_ADDR_REMOCON), the BT state of the camera 20 is controlled to be the pairing standby mode, and the camera 20 transmits information used for the pairing in BT as a response.

The information processing apparatus according to the exemplary embodiment acquires data used for the BT pairing depending on the response from the camera 20 through the communication over Wi-Fi (S116). The data used for the BT pairing includes BD_ADDR_CAM of the camera 20. The data used for the BT pairing may include data indicating a role in the communication over BT of the camera 20 and a model name of the camera 20.

The information processing apparatus according to the exemplary embodiment transmits a pairing request to the camera through the communication over BT (S118). The information processing apparatus may transmit Pairing Request through the communication over BT to the address indicated by BD_ADDR_CAM acquired in step S116.

The camera 20 provides a response to the pairing request transmitted in step S118, and the process for the pairing in the communication over BT is performed between the information processing apparatus according to the exemplary embodiment and the camera 20 (S122).

In FIG. 3, the determination process described in step S108, the getBluetooth-PairingInfo issuing process described in step S110, and the actBluetoothPairing (BD_ADDR_REMOCON) issuing process described in step S114 may be performed automatically after the Wi-Fi connection is established. For example, if the process of each of steps S108, S110, and S114 is set so as not to be performed automatically by the user's operation on the information processing apparatus according to the exemplary embodiment, the information processing apparatus according to the exemplary embodiment may perform these processes depending on the user's operation.

An example of the process for implementing the information processing method according to the exemplary embodiment will be described with the emphasis on the process performed in the information processing apparatus according to the exemplary embodiment.

FIG. 4 is a flowchart illustrating an exemplary process for implementing the information processing method according to the exemplary embodiment. FIG. 4 illustrates an exemplary process performed in the smartphone 10 when the communication over BT (an example of the second communication mode) is established after the communication over Wi-Fi (an example of the first communication mode) is established between the smartphone 10 serving as the information processing apparatus according to the exemplary embodiment and the camera 20 (control target apparatus).

A process described in step S202 of FIG. 4 corresponds to an example of the process of determining, when the communication using the first communication mode is established, whether the control target apparatus is allowed to communicate using the second communication mode supported by the control target apparatus. Processes in steps S204 to S210 of FIG. 4 correspond to an example of the process of allowing the control target apparatus to perform the process for the communication using the second communication mode with a communication target apparatus when the control target apparatus is allowed to communicate using the second communication mode supported by the control target apparatus.

The information processing apparatus according to the exemplary embodiment establishes the communication over Wi-Fi with the camera 20 (S200). The user of the information processing apparatus according to the exemplary embodiment may establish the communication over Wi-Fi between the information processing apparatus according to the exemplary embodiment and the camera 20 by the existing procedures for establishing the communication over Wi-Fi (e.g., by entering the user's password or by using Protected Setup and other commands). For example, when the NFC mode is used in Wi-Fi Protected Setup, the communication over NFC between the information processing apparatus according to the exemplary embodiment and the camera 20 allows data used to establish the communication over Wi-Fi to be transmitted or received, and thus the communication over Wi-Fi is established.

When the communication over Wi-Fi is established in step S200, the information processing apparatus according to the exemplary embodiment determines whether the camera 20 supports BT (S202). The process described in step S202 may correspond to the process of determining whether the control target apparatus supports the second communication mode.

The information processing apparatus according to the exemplary embodiment may perform the determination in step S202 based on data acquired through the communication over Wi-Fi with the use of Web API. In a more specific example, the information processing apparatus according to the exemplary embodiment may issue getMethodTypes to acquire the API information from the camera 20 through the communication over Wi-Fi. When the acquired API information includes "getBluetoothPairingInfo" or "actBluetoothPairing", the information processing apparatus according to the exemplary embodiment determines that the camera 20 supports BT.

If it is not determined in step S202 that the camera 20 supports BT, the information processing apparatus according to the exemplary embodiment does not perform the process of establishing the communication over BT with the camera 20, and then ends the process in FIG. 4.

If it is determined in step S202 that the camera 20 supports BT, the information processing apparatus according to the exemplary embodiment determines whether the communication over BT is paired with the camera 20 (S204). The process described in step S204 may correspond to an example of the process of determining whether the control target apparatus and the information processing apparatus according to the exemplary embodiment serving as a communication target apparatus are ready to communicate with each other using the second communication mode.

The information processing apparatus according to the exemplary embodiment may perform the determination in step S204 based on data acquired through the communication over Wi-Fi with the use of Web API. In a more specific example, the information processing apparatus according to the exemplary embodiment may issue getBluetoothPairingInfo to acquire the BT address of the camera 20 and the pairing state information from the camera 20 through the communication over Wi-Fi. Examples of the pairing state information according to the exemplary embodiment include information indicating whether execution of the BT pairing with the smartphone 10 having BD_ADDR_REMOCON included in the issued getBluetoothPairingInfo (BD_ADDR_REMOCON) is completed. The pairing state information according to the exemplary embodiment may be flag information indicating whether the camera 20 has been paired or a BT address of an apparatus that has been paired with the camera 20.

When the pairing state information indicates that the smartphone 10 and the camera 20 are paired with each other, the information processing apparatus according to the exemplary embodiment determines that the communication over BT is paired between the information processing apparatus according to the exemplary embodiment and the camera 20.

When the pairing state information is the BT address of the apparatus that has been paired with the camera 20, the information processing apparatus according to the exemplary embodiment compares the BT address of the information processing apparatus according to the exemplary embodiment with the BT address of the paired apparatus. If the BT address of the information processing apparatus according to the exemplary embodiment is identical to the BT address of the paired apparatus, the information processing apparatus according to the exemplary embodiment determines that the pairing is completed. If the BT address of the information processing apparatus according to the exemplary embodiment is different from the BT address of the paired apparatus, the information processing apparatus according to the exemplary embodiment determines that the pairing with the information processing apparatus according to the exemplary embodiment is not completed. In this case, however, when the BT pairing between the information processing apparatus according to the exemplary embodiment and the camera 20 does not take precedence, it may be determined that the pairing is completed.

If it is determined in step S204 that the communication over BT is completed, the information processing apparatus according to the exemplary embodiment does not perform the process of establishing the communication over BT with the camera 20, and then ends the process in FIG. 4.

If it is not determined in step S204 that the communication over BT is paired, the information processing apparatus according to the exemplary embodiment transmits an instruction to shift its mode into a BT pairing standby mode to the camera 20, and acquires, as a response to the instruction, information (data) necessary for the communication over BT from the camera 20 (S206).

The information processing apparatus according to the exemplary embodiment may transmit the instruction to shift its mode into the BT pairing standby mode through the communication over Wi-Fi by using the Web API. As a more specific example, the information processing apparatus according to the exemplary embodiment issues act-BluetoothPairing (BD_ADDR_REMOCON) to shift the mode of the camera 20 into the BT pairing standby mode. The camera 20, when it receives actBluetoothPairing (BD_ADDR_REMOCON), is controlled so that the BT state of the camera 20 is shifted into the pairing standby mode in which the pairing with the device having the BT address indicated by the BD_ADDR_REMOCON is suspended. The transmission of the BD_ADDR_REMOCON corresponds to an example of the transmission of the identification information of the information processing apparatus according to the exemplary embodiment.

The information processing apparatus according to the exemplary embodiment acquires Bluetooth (registered trademark) Address (BD_ADDR_CAM) of the camera 20 depending on the response from the camera 20 through the communication over Wi-Fi.

The information processing apparatus according to the exemplary embodiment transmits a pairing request to the camera 20 through the communication over BT (S208). The information processing apparatus according to the exemplary embodiment may transmit Pairing Request through the communication over BT to the address indicated by the BD_ADDR_CAM acquired in step S206.

The camera 20 provides a response to the pairing request transmitted in step S208, and the process of pairing in the communication over BT is performed between the information processing apparatus according to the exemplary embodiment and the camera 20 (S210).

The camera 20 performs the matching process using the BD_ADDR_REMOCON (an example of identification information) transmitted in step S206 from the information processing apparatus according to the exemplary embodiment. The camera 20 may not perform the pairing based on the pairing request transmitted from an apparatus other than the apparatus supporting the BD_ADDR_REMOCON acquired in step S206.

When the connection request is a request used to establish the communication using the second communication mode between the information processing apparatus according to the exemplary embodiment and the control target apparatus, the information processing apparatus according to the exemplary embodiment may perform the process in FIG. 4.

The process for implementing the information processing method according to the exemplary embodiment when the connection request is a request used to establish the communication using the second communication mode between the information processing apparatus according to the exemplary embodiment and the control target apparatus is not limited to the process shown in FIG. 4.

For example, when the communication over Wi-Fi is established in step S200, the communication over NFC may be used. In this case, data including BT address information of each apparatus used to establish the communication over BT may be transmitted or received through the communication over NFC between the smartphone 10 (information processing apparatus according to the exemplary embodiment) and the camera 20 (control target apparatus). The communication over NFC used to establish the communication over Wi-Fi corresponds to an example of the communication using other communication modes performed to establish the communication using the first communication mode.

As described above for example, the communication over NFC used to establish the communication over Wi-Fi makes it possible to reduce the amount of data which is transmitted or received through the communication over BT in steps S206 to S210 when the BT address information and other like information are transmitted or received.

The communication over NFC may allow the data used to establish the communication over BT to be used only for establishment of the Wi-Fi connection without the transmission or reception of the data. In this case, the process shown in FIG. 4 makes it possible to reduce the amount of data transmitted or received through the communication over NFC, compared to when the communication over NFC is necessary to transmit or receive the BT address information, and thus the communication time can be reduced.

The information processing apparatus according to the exemplary embodiment may not perform the process, for example, described in step S204 of FIG. 4. When the process described in step S204 is not performed, if it is determined that the communication target apparatus supports the second communication mode in step S202, the information processing apparatus according to the exemplary embodiment determines that the control target apparatus is allowed to communicate using the second communication mode, and then performs the process described in steps S206 to S210.

FIG. 4 illustrates a specific example of employing the Web API. However, for example, when the Web API is difficult to construct in view of resources, the camera 20 may be served as a hypertext transfer protocol (HTTP) server, and opens data such as extensible markup language (XML). This data may include information necessary for pairing.

Although FIG. 4 illustrate the example in which the established first communication mode is Wi-Fi and the second communication mode is BT, the first communication mode and the second communication mode according to the exemplary embodiment may be combined in any combination. For example, a combination in which the communication over BT (an example of the first communication mode) is established and then the communication over Wi-Fi (an example of the second communication mode) is established is possible.

FIG. 5 is a diagram illustrated to describe another example of the process for implementing the information processing method according to the exemplary embodiment. FIG. 5 illustrates an example of the process in which a process execution request transmitted from the information processing apparatus according to the exemplary embodiment that is the smartphone 10 shown in 10 allows the camera 20 shown in FIG. 1 to perform a process of capturing an image.

The processes described in steps S300, S302, S304, S306, S308, S322, S324, S334, S336, S342, S344, and S346 shown in FIG. 5 similarly correspond to the processes described in steps S100, S102, S104, S106, S108, S110, S112, S114, S116, S118, S120, and S122 shown in FIG. 3, respectively. Thus, the difference between steps shown in FIGS. 5 and 3 will be described.

The information processing apparatus according to the exemplary embodiment may issue getBluetoothPairingInfo (S304) to acquire API information (S306).

The getMethodTypes that is automatically transmitted in step S304 of FIG. 5 corresponds to an example of the transmission instmcdon used to transmit the communication-related information according to the exemplary embodiment and the control information according to the exemplary embodiment. When the camera 20 supports BT, the API information acquired in step S306 may include "getBluetoothPairigInfo" or "actBluetoothPairing" that is an example of communication-related information, as described above. The API information acquired in step S306 may include "startLiveView" or "getShootMode" that is an example of the control information. Other examples of the control information included in the API information acquired in step S306 may include information related to a mode change API for switching modes (e.g., still image mode and image-shooting mode) of the camera 20, an API for instructing the camera 20 to start image capturing, an API for instructing the camera 20 to stop image capturing, an API for transmitting data indicating settings of the camera 20 to the smartphone 10, and an API for changing settings of the camera 20. The control information according to the exemplary embodiment may include information relating to an imaging process executed by the control target apparatus. When the request through the API included in the above-mentioned API information is transmitted by the smartphone 10 using Wi-Fi and the transmitted request is received by the camera 20, the camera 20 performs a process corresponding to the request through API and provides a response to the smartphone 10.

The information processing apparatus according to the exemplary embodiment transmits a process execution request (e.g., startLiveView), which is used to execute a process for live view executable by the camera 20, using Wi-Fi (an example of the communication using the first communication mode) based on the control information acquired in step S306 (S310). The process execution request may be transmitted automatically after the information processing apparatus according to the exemplary embodiment performs the determination process in step S308 or may be transmitted based on the user's operation on the information processing apparatus according to the exemplary embodiment.

The camera 20, when it acquires the process execution request transmitted in step S310, starts the process for live view based on the process execution request (S312) and transmits "LiveViewURL" as a response to the information processing apparatus according to the exemplary embodiment (S314). The "LiveViewURL" transmitted in step S314 may be data indicating a uniform resource locator (URL) of a source location acquiring live view (a through-the-lens image), and the information processing apparatus according to the exemplary embodiment can acquire live view by having access to the URL.

The information processing apparatus according to the exemplary embodiment, when it acquires "LiveViewURL" transmitted from the camera 20 in step S316, starts the process for acquiring and displaying live view (S316), and transmits "GET LiveView" (an example of instruction to acquire live view) using Wi-Fi (an example of the communication using the first communication mode) (S318). The process described in step S318 may correspond to the process for accessing the URL indicated by "LiveViewURL" using HTTP GET to acquire image data.

The camera 20, when it acquires "GET LiveView" transmitted step S318, transmits live-view image data to the information processing apparatus according to the exemplary embodiment as a response (S320).

The processes in steps S326, S338, S348, and S356 are similarly performed to the process in step S318, and the processes in steps S328, S340, S350, and S358 are similarly performed to the process in step S320. The information processing apparatus according to the exemplary embodiment acquires live-view image data in an appropriate manner.

The information processing apparatus according to the exemplary embodiment transmits "getshootMode" (an example of the instruction to transmit image-shooting mode) using Wi-Fi (an example of the communication using the first communication mode) based on the control information acquired in step S306 (S352).

The camera 20, when it acquires "getshootMode" transmitted in step S352, transmits "movie" that is an example of data indicating the image-shooting mode as a response to the information processing apparatus according to the exemplary embodiment (S354).

For example, the process shown in FIG. 5 performed by the information processing apparatus according to the exemplary embodiment allows the camera 20 serving as the control target apparatus to perform, in parallel, the process for establishing the communication using the second communication mode that is similar to FIG. 3 and the process for executing the process executable by the control target apparatus.

The process for establishing the communication using the second communication mode by the information processing apparatus according to the exemplary embodiment and the process for executing the process executable by the control target apparatus may be performed in a parallel way. These two processes are not necessarily performed at the exact same time, but they may be performed in any combination or order in a continuous time series as shown in FIG. 5. In other words, when the user uses the information processing apparatus according to the exemplary embodiment, the control target apparatus may be unable to be controlled until the communication using the second communication mode is established, but it is desirable to avoid the inability to control the control target apparatus. For example, in the example shown in FIG. 5, the information processing apparatus according to the exemplary embodiment may display the live view image received from the camera 20 on a display provided in the information processing apparatus or an external display, and at the same time, may display information, which indicates that the BT connection is in progress or the BT connection is completed, on a part area of the display.

The communication over Wi-Fi and the communication over BT are established in step S346. Thus, the steps subsequent to step S346 can use selectively communication paths as necessary. For example, the information processing apparatus according to the exemplary embodiment can transmit the control request using the API without necessity of image transmission via the BT communication path with low power consumption to control the control target apparatus with low power consumption in the steps subsequent to step S346. This is based on the API information obtained by issuing getMethodTypes as described in step S104 of FIG. 3, which includes API without necessity of image transmission (e.g., API for instructing image shooting or API for changing command or image-shooting mode). The communication over Wi-Fi and the communication over BT are not necessary to be performed continuously. For example, the information processing apparatus according to the exemplary embodiment detects that the control to transmit API without image transmission from the control target apparatus such as "GET LiveView" for a certain period of time is not performed (API with image transmission is not used). Then, the information processing apparatus can perform a control process for disconnecting the Wi-Fi connection and can continue to perform the communication over BT, leading to reduction in power consumption.

In FIG. 5, the determination process in step S308, the getBluetoothPairingInfo issuing process in step S322, and the actBluetoothPairing (BD_ADDR_REMOCON) issuing process in step S334 are performed automatically, for example, after the Wi-Fi connection is established. For example, if each process of steps S308, S322, and S334 is set so as not to be performed automatically by the user's operation on the information processing apparatus according to the exemplary embodiment, the information processing apparatus according to the exemplary embodiment may perform these processes depending on the user's operation.

It will be understood that the process for allowing the control target apparatus to perform the processes for establishing the communication using the second communication mode and for executing the process executable by the control target apparatus is not limited to the example shown in FIG. 5.

(3-2) Second Example of Process for implementing Information Processing Method according to Exemplary Embodiment: an exemplary process performed in a case where the connection request is a request used to establish the communication using the second communication mode between one control target apparatus (the first control target apparatus) and another control target apparatus (the second control target apparatus) different from the control target apparatus The description will be given of an exemplary process performed in a case where the connection request is a request used to establish the communication using the second communication mode between one control target apparatus (the first control target apparatus) and another control target apparatus (the second control target apparatus) different from the control target apparatus.

FIG. 6 is a diagram illustrated to describe an exemplary process for implementing the information processing method according to the exemplary embodiment, and illustrates an exemplary process performed in a case where the connection request is a request used to establish the communication using the second communication mode between one control target apparatus (the first control target apparatus) and another control target apparatus (the second control target apparatus) different from the control target apparatus.

In the example shown in FIG. 6, for example, the smartphone 10 corresponds to the information processing apparatus according to the exemplary embodiment, and the camera 20 and a television set 40 are all corresponded to the control target apparatus. In the example shown in FIG. 6, the television set 40 may be a communication target apparatus with regard to the camera 20 serving as the control target apparatus. The camera 20 may be a communication target apparatus with regard to the television set 40 serving as the control target apparatus. In other words, in the example shown in FIG. 6, each of the camera 20 and the television set 40 can serve as a control target apparatus or a communication target apparatus.

For example, in FIG. 6, it is assumed that the camera 20 and the television set 40 support Wi-Fi and BT, respectively, and the smartphone serving as the information processing apparatus according to the exemplary embodiment supports Wi-Fi. For example, it is assumed that the user of the information processing apparatus according to the exemplary embodiment intends to access the camera 20 and the television set 40 through the communication over BT.

The information processing apparatus according to the exemplary embodiment establishes the communication over Wi-Fi (an example of the first communication mode) between the camera 20 and the information processing apparatus and between the television set 40 and the information processing apparatus, for example, by performing a process similar to the process in step S200 of FIG. 4. The information processing apparatus according to the exemplary embodiment determines whether each of the camera 20 and the television set 40 (both are an example of the control target apparatus) is allowed to perform the communication over BT (an example of the second communication mode), for example, by performing a process similar to the process in steps S202 and S204 of FIG. 4. As an example, the information processing apparatus according to the exemplary embodiment acquires information indicating whether each of the camera 20 and the television set 40 according to the exemplary embodiment supports BT and information indicating whether pairing is completed, which are similar to the determination process in steps S202 and S204 of FIG. 4, respectively, and determines whether the communication over BT is possible based on the acquired information.

When the information processing apparatus according to the exemplary embodiment determines that each of the camera 20 and the television set 40 is allowed to perform the communication over BT, the information processing apparatus according to the exemplary embodiment transmits a pairing request for the communication over BT to each of the camera 20 and the television set 40, and allows each of the camera 20 and the television set 40 serving as the control target apparatus to perform the communication over BT. The information processing apparatus according to the exemplary embodiment may transmit the identification information acquired from the camera 20 serving as the control target apparatus to the television set 40 serving as the communication target apparatus. Alternatively, the information processing apparatus according to the exemplary embodiment may transmit the identification information acquired from the television set 40 serving as the control target apparatus to the camera 20 serving as the communication target apparatus. To perform each process, a process similar to that in the first example described above may be used.

FIG. 7 is a diagram illustrated to describe an exemplary process for implementing the information processing method according to the exemplary embodiment, and illustrates another example in a case where the control target apparatus is an external apparatus of the information processing apparatus according to the exemplary embodiment.

In the example shown in FIG. 7, for example, the smartphone corresponds to the information processing apparatus according to the exemplary embodiment, and each of the camera 20 and a server 50 (or a server group, the same hereinafter) may correspond to the control target apparatus. The server 50 provides a cloud service and other like services. In the example shown in FIG. 7, the server 50 may be a communication target apparatus with regard to the camera 20 serving as the control target apparatus. The camera 20 may be a communication target apparatus with regard to the server 50 serving as the control target apparatus. In other words, in the example shown in FIG. 7, each of the camera 20 and the server 50 can serve as a control target apparatus or a communication target apparatus.

In the example shown in FIG. 7, the server 50 takes the place of the television set 40 shown in FIG. 6. The communication between apparatuses uses wireless communication using LTE, or uses the second communication mode, such as Wi-Fi, internet protocol (IP) network, and other technologies, which is different from the communication mode shown in the example of FIG. 6. Thus, in the example shown in FIG. 7, the control process performed by the information processing apparatus according to the exemplary embodiment allows each of the camera 20 and the server 50 serving as the control target apparatus to perform the communication using Wi-Fi or IP network (an example of the second communication mode). As shown in FIG. 7, the communication between the camera 20 and the server 50 may be performed through other apparatuses such as a relay 60 interposed between them.

If the camera 20 and the server 50 determine whether the communication between them using a predetermined communication mode is possible, the determination process may be performed on the basis of information indicating whether each of the camera 20 and the server 50 is allowed to communicate using the predetermined communication mode.

(Information Processing Apparatus According to Exemplary Embodiment)

The description will be given of an exemplary configuration of the information processing apparatus according to the exemplary embodiment that can perform the process for implementing the information processing method according to the exemplary embodiment described above.

FIG. 8 is a block diagram illustrating an exemplary configuration of an information processing apparatus 100 according to the exemplary embodiment. In the example shown in FIG. 1, one of the smartphone 10 and the camera 20 corresponds to the information processing apparatus 100. In the examples shown in FIGS. 6 and 7, the smartphone 10 corresponds to the information processing apparatus 100. The information processing apparatus 100 according to the exemplary embodiment is not limited to the smartphone 10 or the camera 20. Other applications of the information processing apparatus according to the exemplary embodiment will be described later.

The information processing apparatus 100 may be configured to include a first communication unit 102, a second communication unit 104, a controller 106, and an operation unit 108.

The information processing apparatus 100 may be configured to include a read only memory (ROM, not shown), a random access memory (RAM, not shown), a storage unit (not shown), and a display unit (not shown) for displaying various pictures on its display screen. In the information processing apparatus 100, components are interconnected via a bus that serves as a data transmission channel.

The ROM (not shown) is used to store data for control, such as programs and operation parameters used by the controller 106. The RAM (not shown) is used to store temporarily programs and other instructions for execution by the controller 106.

The storage unit (not shown) is a storage mechanism provided in the information processing apparatus 100, and stores data, for example, identification information used in the information processing method according to the exemplary embodiment or stores various data such as a variety of applications. Examples of the storage unit (not shown) include a magnetic recording medium such as hard disk, and nonvolatile memory such as flash memory. The storage unit (not shown) may be removable from the information processing apparatus 100.

Examples of the display unit (not shown) include a display device described later.

(Exemplary Hardware Configuration of Information Processing Apparatus 100)

FIG. 9 is a diagram illustrated to describe an exemplary hardware configuration of the information processing apparatus 100 according to the exemplary embodiment. The information processing apparatus 100 may be configured to include an MPU 150, a ROM 152, a RAM 154, a recording medium 156, an input-output interface 158, an operation input device 160, a display device 162, a first communication interface 164, and a second communication interface 166. In the information processing apparatus 100, components are interconnected via a bus 168 that serves as a data transmission channel.

The MPU 150 may be configured to include one or more processors composed of an arithmetic logic circuit such as micro processing unit (MPU) and various processing circuits, and functions as the controller 106 that controls the entire information processing apparatus 100.

The ROM 152 stores data for control, such as programs and operation parameters used by the MPU 150. The RAM 154 stores temporarily programs and other data executed by the MPU 150.

The recording medium 156 functions as the storage unit (not shown), and stores data relating to the information processing method according to the exemplary embodiment such as identification information and a variety of data including various types of applications. Examples of the recording medium 156 include a magnetic recording medium such as hard disk, and nonvolatile memory such as flash memory. The recording medium 156 may be removable from the information processing apparatus 100.

The input-output interface 158 is used for connection of the operation input device 160 and the display device 162. The operation input device 160 functions as the operation unit 108. The display device 162 functions as the display unit (not shown) Examples of the input-output interface 158 include a universal serial bus (USB) terminal, a digital visual interface (DVI) terminal, a high-definition multimedia interface (HDMI, registered trademark) terminal, and various types of processing circuits.

The operation input device 160 functions as the operation unit 108. The operation input device 160 is provided, for example, on the information processing apparatus 100 and is connected to the input-output interface 158 within the information processing apparatus 100. Examples of the operation input device 160 include a button, a direction key, a rotation type selector such as a jog dial, and a combination thereof.

The display device 162 is provided, for example, on the information processing apparatus 100 and is connected to the input-output interface 158 within the information processing apparatus 100. Examples of the display device 162 include a liquid crystal display (LCD) and an organic electro-luminescence (EL) display (or also referred to as an organic light emitting diode (OLED) display).

It will be understood that the input-output interface 158 may be connected to an operation input device (e.g., keyboard or mouse) or a display device such as an external display device, which serves as an external apparatus of the information processing apparatus 100. The display device 162 may be a device such as a touch panel on which a display process and the user's operation can be performed.

The first communication interface 164 is one communication mechanism, which is provided in the information processing apparatus 100. The first communication interface 164 functions as the first communication unit 102 for communicating with an external apparatus, for example, the control target apparatus according to the exemplary embodiment, by wire or wireless through a network (or directly). Examples of the first communication interface 164 include a communication antenna and radio frequency (RE) circuit (wireless communication), an IEEE 802.15.1 port and transmission-reception circuit (wireless communication), an IEEE 802.11 port and transmission-reception circuit (wireless communication), or a local area network (LAN) terminal and transmission-reception circuit (wired communication).

The second communication interface 166 is another communication mechanism, which is provided in the information processing apparatus 100. The second communication interface 166 functions as the second communication unit 104 for communicating with an external apparatus, for example, the control target apparatus according to the exemplary embodiment, using communication modes other than that of the first communication interface 164, by wire or wireless through a network (or directly). Examples of the second communication interface 166 include a communication antenna and radio frequency (RF) circuit (wireless communication), an IEEE 802.15.1 port and transmission-reception circuit (wireless communication), an IEEE 802.11 port and transmission-reception circuit (wireless communication), or a LAN terminal and transmission-reception circuit (wired communication).

The information processing apparatus 100 having, for example, the configuration shown in FIG. 9 performs the process for implementing the information processing method according to the exemplary embodiment. The hardware configuration of the information processing apparatus 100 according to the exemplary embodiment is not limited to that shown in FIG. 9.

As an example, the information processing apparatus 100, when it communicates with an external apparatus via an external communication device connected thereto, may have the configuration that does not include one or both of the first communication interface 164 and the second communication interface 166.

The first communication interface 164 and the second communication interface 166 may be configured as an integrated communication interface. In other words, the information processing apparatus 100 may be configured to include a communication device capable of communication with one or more external apparatuses, using on a plurality of communication modes. The information processing apparatus 100 may be configured to further include one or more communication interfaces capable of communication with an external apparatus using a communication mode that is different from the communication mode used in the first communication interface 164 and the second communication interface 166.

The information processing apparatus 100 may be an apparatus having an image capturing function, for example, the information processing apparatus 100 serving as the camera 20 or the smartphone 10 having an image capturing function. In this case, the information processing apparatus 100 may be configured to further include an imaging device that functions as an imaging unit (not shown) used to capture and create an image (moving or still image).

The imaging device may be configured to include a lens-imaging element module and a signal processing circuit. The lens-imaging element module is composed of, for example, an optical lens and an image sensor that employs a plurality of complementary metal oxide semiconductor (CMOS) or equivalent imaging elements. The signal processing circuit includes an automatic gain control (AGC) circuit or an analog to digital converter (ADC), and converts an analog signal generated by the imaging element into a digital signal (image data). The signal processing circuit may perform various processes relating to RAW development. The signal processing circuit may perform various processes including white balance correction processing, color correction processing, gamma correction processing, YCbCr conversion processing, and edge enhancement processing.

The information processing apparatus 100 may have the configuration that does not include the recording medium 156, the operation input device 160, or the display device 162.

As an example, the configuration shown in FIG. 9 (or configuration of its modification) may be embodied using one or more integrated circuits (ICs).

Referring back to FIG. 8, an exemplary configuration of the information processing apparatus 100 will be described. The first communication unit 102 is one communication mechanism, which is provided in the information processing apparatus 100. The first communication unit 102 communicates with an external apparatus such as the control target apparatus according to the exemplary embodiment, by wire or wireless through a network (or directly). The controller 106 may control the communication performed through the first communication unit 102.

Examples of the first communication unit 102 include a communication antenna and RF circuit, or a LAN terminal and transmission-reception circuit. However, the configuration of the first communication unit 102 is not limited to the above example. As an example, the first communication unit 102 may have a configuration compatible with any standard capable of communication such as a USB terminal and transmission-reception circuit or any configuration capable of communication with an external apparatus through a network.

The second communication unit 104 is another communication mechanism, which is provided in the information processing apparatus 100. The second communication unit 104 communicates with an external apparatus such as the control target apparatus according to the exemplary embodiment, using a communication mode different from that of the first communication unit 102, by wire or wireless through a network (or directly). The controller 106 may control the communication performed through the second communication unit 104.

Examples of the second communication unit 104 include a communication antenna and RF circuit, or a LAN terminal and transmission-reception circuit. However, the configuration of the second communication unit 104 is not limited to the above example. As an example, the second communication unit 104 may have a configuration compatible with any standard capable of communication such as a USB terminal and transmission-reception circuit or any configuration capable of communication with an external apparatus through a network.

In the information processing apparatus 100, the first communication unit 102 may play a role in performing the communication using the first communication mode, and the second communication unit 104 may play a role in performing communication using the second communication mode. When the first communication unit 102 and the second communication unit 104 play a role in performing communication using the first communication mode and the second communication mode respectively, the first communication unit 102 may perform the communication using Wi-Fi, and the second communication unit 104 may perform the communication using BT. As described above, it will be understood that examples of a combination of the first communication mode and the second communication mode to be used to perform the communication according to the exemplary embodiment are not limited to the combination of Wi-Fi and BT.

The controller 106 is configured to include, for example, an MPU, and plays a role in controlling the entire information processing apparatus 100.

The controller 106 plays a leading role in performing the control process for implementing the information processing method according to the exemplary embodiment. The controller 106 controls the communication using the first communication mode and the communication using the second communication mode that is different form the first communication mode.

The controller 106, for example, when it establishes the communication using the first communication mode with the control target apparatus, performs the process for acquiring the communication-related information and the control information from the control target apparatus. The controller 106 may transmit the connection request used to establish the communication using the second communication mode to the control target apparatus based on the communication-related information. The controller 106 may transmit the process execution request, which is used to allow the control target apparatus to perform a process executable by the control target apparatus, to the control target apparatus, based on the control information.

The operation unit 108 is an operation mechanism that is operable by the user and is provided in the information processing apparatus 100. An operation signal corresponding to the operation performed on the operation unit 108 makes it possible for the controller 106 to perform various processes including transmission of the process execution request.

Examples of the operation unit 108 include the operation input device 160.

The information processing apparatus 100 that has, for example, the configuration shown in FIG. 8 performs the process (e.g., the control process) for implementing the information processing method according to the exemplary embodiment.

Thus, the information processing apparatus 100 that has, for example, the configuration shown in FIG. 8 makes it possible to control the communication using a plurality of different communication modes.

The information processing apparatus 100 that has, for example, the configuration shown in FIG. 8 can perform the process for implementing the information processing method according to the exemplary embodiment as described above, resulting in achievement of advantageous effects.

The configuration of the information processing apparatus according to the exemplary embodiment is not limited to that shown in FIG. 8.

As described above, the control process may be a part of the process for implementing the information processing method according to the exemplary embodiment for the sake of simplicity. Thus, the configuration for implementing the process of the information processing method according to the exemplary embodiment is not limited to the configuration having the controller 106 shown in FIG. 8. It may be possible to have the configuration including a plurality of processors used to perform different processes for implementing the information processing method according to the exemplary embodiment.

The information processing apparatus according to the exemplary embodiment, for example, when it communicates with an external apparatus via an external communication device having the function and configuration similar to those of the first communication unit 102, may have the configuration that does not include the first communication unit 102.

The information processing apparatus according to the exemplary embodiment, for example, when it communicates with an external apparatus via an external communication device having the function and configuration similar to those of the second communication unit 104, may have the configuration that does not include the second communication unit 104.

Although FIG. 8 illustrates the first communication unit 102 and the second communication unit 104 configured as separate units, the first communication unit 102 and the second communication unit 104 may be configured as a single IC or physical module. The same antenna may be shared for the communication modes that respectively correspond to the first communication unit 102 and the second communication unit 104.

The information processing apparatus according to the exemplary embodiment may have the configuration that does not include the operation unit 108.

(Control Target Apparatus According to Exemplary Embodiment)

An exemplary configuration of the control target apparatus according to the exemplary embodiment mentioned above will be described.

FIG. 10 is a block diagram illustrating an exemplary configuration of a control target apparatus 200 according to the exemplary embodiment. For example, in the example shown in FIG. 1, when one of the smartphone 10 and the camera 20 is the information processing apparatus 100, the other corresponds to the control target apparatus 200. For example, in the examples shown in FIGS. 6 and 7, the camera 20, the television set 40, and the server 50 correspond to the control target apparatus 200. An exemplary configuration in a case where the control target apparatus 200 is the camera 20 will be mainly illustrated. The control target apparatus 200 according to the exemplary embodiment is not limited to the smartphone 10, the camera 20, the television set 40, or the server 50. Other applications of the control target apparatus according to the exemplary embodiment will be described later.

The control target apparatus 200 may be configured to include a first communication unit 202, a second communication unit 204, a controller 206, an operation unit 208, a display unit 210, and an imaging unit 212.

The control target apparatus 200 may be configured to include, for example, ROM (not shown), RAM (not shown), and a storage unit (not shown). In the control target apparatus 200, components are interconnected via a bus that serves as a data transmission channel.

The ROM (not shown) is used to store data for control such as programs and operation parameters used by the controller 206. The RAM (not shown) is used to temporarily store programs and other instructions for execution by the controller 206.

The storage unit (not shown) is a storage mechanism, which is provided in the control target apparatus 200. The storage unit stores, for example, image data indicating an image captured by the imaging unit 212 or various data such as a variety of applications. Examples of the storage unit (not shown) include a magnetic recording medium such as hard disk, and nonvolatile memory such as flash memory. The storage unit (not shown) may be removable from the control target apparatus 200.

(Exemplary Hardware Configuration of Control Target Apparatus 200)

FIG. 11 is a diagram illustrated to describe an exemplary hardware configuration of the control target apparatus 200 according to the exemplary embodiment. The control target apparatus 200 may be configured to include an MPU 250, a ROM 252, a RAM 254, a recording medium 256, an input-output interface 258, an operation input device 260, a display device 262, a first communication interface 264, a second communication interface 266, and an imaging device 268. In the control target apparatus 200, components are interconnected via a bus 270 that serves as a data transmission channel.

The MPU 250 may be configured to include one or more processors composed of an arithmetic logic unit such as micro processing unit (MPU) and various processing circuits, and functions as the controller 206 that controls the entire control target apparatus 200.

The ROM 252 stores data for control, such as programs and operation parameters used by the MPU 250. The RAM 254 stores temporarily programs and other data executed by the MPU 250.

The recording medium 256 functions as the storage unit (not shown) and stores, for example, image data indicating an image captured by the imaging unit 212 or various data such as a variety of applications. Examples of the recording medium 256 include a magnetic recording medium such as hard disk, and nonvolatile memory such as flash memory. The recording medium 256 may be removable from the control target apparatus 200.

The input-output interface 258 is used for connection of the operation input device 260 and the display device 262. The operation input device 260 functions as the operation unit 208. The display device 262 functions as the display unit 210. Examples of the input-output interface 258 include a USB terminal, a DVI terminal, an HDMI (registered trademark) terminal, and various types of processing circuits.

The operation input device 260 functions as the operation unit 208. The operation input device 260 is provided, for example, on the control target apparatus 200 and is connected to the input-output interface 258 within the control target apparatus 200. Examples of the operation input device 260 include a button, a direction key, a rotation type selector such as a jog dial, and a combination thereof.

The display device 262 functions as the display unit 210. The display device 262 is provided, for example, on the control target apparatus 200 and is connected to the input-output interface 258 within the control target apparatus 200. Examples of the display device 262 include a liquid crystal display and an organic EL display.

It will be understood that the input-output interface 258 may be connected to an external device such as an external operation input device (e.g., keyboard or mouse) or an external display device, which serves as an external apparatus of the control target apparatus 200. The display device 262 may be a device such as a touch panel on which a display process and the user's operation can be performed.

The first communication interface 264 is one communication mechanism, which is provided in the control target apparatus 200. The first communication interface 164 functions as the first communication unit 202 for communicating with an external apparatus, for example, the information processing apparatus according to the exemplary embodiment, by wire or wireless through a network (or directly). Examples of the first communication interface 264 include a communication antenna and RE circuit (wireless communication), an IEEE 802.15.1 port and transmission-reception circuit (wireless communication), an IEEE 802.11 port and transmission-reception circuit (wireless communication), or a LAN terminal and transmission-reception circuit (wired communication).

The second communication interface 266 is another communication mechanism, which is provided in the control target apparatus 200. The second communication interface 266 functions as the second communication unit 204 for communicating with an external apparatus, for example, the information processing apparatus according to the exemplary embodiment, using a communication mode different from that of the first communication interface 264, by wire or wireless through a network (or directly). Examples of the second communication interface 266 include a communication antenna and RE circuit (wireless communication), an IEEE 802.15.1 port and transmission-reception circuit (wireless communication), an IEEE 802.11 port and transmission-reception circuit (wireless communication), or a LAN terminal and transmission-reception circuit (wired communication).

The imaging device 268 is an imaging mechanism, which is provided in the control target apparatus 200. The imaging device 268 functions as the imaging unit 212 that captures and creates an image (a moving or still image).

The imaging device 268 may be configured to include a lens-imaging element module and a signal processing circuit. The lens-imaging element module is composed of, for example, an optical lens and an image sensor that employs a plurality of CMOS or equivalent imaging elements. The signal processing circuit includes an AGC circuit or ADC, and converts an analog signal generated by the imaging element into a digital signal (image data). The signal processing circuit may perform various processes relating to RAW development. The signal processing circuit may perform various processes including white balance correction processing, color correction processing, gamma correction processing, YCbCr conversion processing, and edge enhancement processing.

The control target apparatus 200 having, for example, the configuration shown in FIG. 11 performs various processes in the control target apparatus according to the exemplary embodiment. The hardware configuration of the control target apparatus 200 according to the exemplary embodiment is not limited to that shown in FIG. 11.

As an example, the control target apparatus 200, when it communicates with an external apparatus via an external communication device connected thereto, may have the configuration that does not include one or both of the first communication interface 264 and the second communication interface 266.

The first communication interface 264 and the second communication interface 266 may be configured as an integrated communication interface. In other words, the control target apparatus 200 may be configured to include a communication device capable of communication with one or more external apparatuses, using on a plurality of communication modes. The control target apparatus 200 may be configured to further include one or more communication interfaces capable of communication with an external apparatus using a communication mode that is different from the communication mode used in the first communication interface 264 and the second communication interface 266.

For example, when the control target apparatus 200 is an apparatus that is not necessary to have an imaging function, the control target apparatus 200 may not include the imaging device 268.

The control target apparatus 200 may have the configuration that does not include, for example, the recording medium 256, the operation input device 260, and the display device 262.

For example, the configuration shown in FIG. 11 (or, configuration of its modification) may be embodied using one or more integrated circuits (ICs).

Referring back to FIG. 10, an exemplary configuration of the control target apparatus 200 will be described. The first communication unit 202 is one communication mechanism, which is provided in the control target apparatus 200. The first communication unit 202 communicates with an external apparatus such as the information processing apparatus according to the exemplary embodiment, by wire or wireless through a network (or directly). The controller 206 may control the communication performed through the first communication unit 202.

Examples of the first communication unit 202 include a communication antenna and RF circuit, or a LAN terminal and transmission-reception circuit. However, the configuration of the first communication unit 202 is not limited to the above example. As an example, the first communication unit 202 may have a configuration compatible with any standard capable of communication such as a USB terminal and transmission-reception circuit or any configuration capable of communication with an external apparatus through a network.

The second communication unit 204 is another communication mechanism, which is provided in the control target apparatus 200. The second communication unit 204 communicates with an external apparatus such as the information processing apparatus according to the exemplary embodiment, using a communication mode different from that of the first communication unit 202, by wire or wireless through a network (or directly). The controller 206 may control the communication performed through the second communication unit 204.

Examples of the second communication unit 204 include a communication antenna and RE circuit, or a LAN terminal and transmission-reception circuit. However, the configuration of the second communication unit 204 is not limited to the above example. As an example, the second communication unit 204 may have a configuration compatible with any standard capable of communication such as a USB terminal and transmission-reception circuit or any configuration capable of communication with an external apparatus through a network.

In the control target apparatus 200, the first communication unit 202 may play a role in performing the communication using the first communication mode, and the second communication unit 204 may play a role in performing communication using the second communication mode. When the first communication unit 202 and the second communication unit 204 play a role in performing communication using the first communication mode and the second communication mode respectively, the first communication unit 202 may perform the communication using Wi-Fi, and the second communication unit 204 may perform the communication using BT. As described above, it will be understood that examples of a combination of the first communication mode and the second communication mode to be used to perform the communication according to the exemplary embodiment are not limited to the combination of Wi-Fi and BT.

The controller 206 is configured to include, for example, an MPU, and plays a role in controlling the entire control target apparatus 200. The controller 206 performs various processes in the control target apparatus according to the exemplary embodiment as described above.

The operation unit 208 is an operation mechanism that is operable by the user and is provided in the control target apparatus 200. An operation signal corresponding to the operation performed on the operation unit 208 makes it possible for the controller 206 to perform various processes including an image capturing process by the imaging unit 212, or processing performed in steps S308, S322, and S334 of FIG. 5.

Examples of the operation unit 208 include the operation input device 260.

The display unit 210 is a display mechanism, which is provided in the control target apparatus 200. The display unit 210 displays various images or pictures including an image such as a through-the-lens image or captured image and an image related to UI. Examples of the display unit 210 include the display device 262.

The imaging unit 212 is an imaging mechanism, which is provided in the control target apparatus 200, and captures and creates an image (a moving or still image). Examples of the imaging unit 212 include the imaging device 268.

The control target apparatus 200 having, for example, the configuration shown in FIG. 10 performs various processes in the control target apparatus according to the exemplary embodiment.

The hardware configuration of the control target apparatus according to the exemplary embodiment is not limited to that shown in FIG. 10.

The control target apparatus according to the exemplary embodiment, for example, when it communicates with an external apparatus via an external communication device having the function and configuration similar to those of the first communication unit 202, may have the configuration that does not include the first communication unit 202.

The control target apparatus according to the exemplary embodiment, for example, when it communicates with an external apparatus via an external communication device having the function and configuration similar to those of the second communication unit 204, may have the configuration that does not include the second communication unit 204.

Although FIG. 10 illustrates the first communication unit 102 and the second communication unit 204 configured as separate units, the first communication unit 202 and the second communication unit 204 may be configured as a single IC or physical module. The same antenna may be shared for the communication modes that respectively correspond to the first communication unit 202 and the second communication unit 204.

The control target apparatus according to the exemplary embodiment may have the configuration that does not include one or more of the operation unit 208, the display unit 210, and the imaging unit 212.

In the above, the information processing apparatus has been described as an exemplary embodiment, but the embodiment of the present disclosure is not limited thereto. The exemplary embodiment of the present disclosure may be applied to various types of devices capable of performing the process for implementing the information processing method according to the exemplary embodiment. Examples of the device include a computer such as personal computers (PCs) and servers, communication apparatus such as mobile phones and smartphones, tablet type apparatus, imaging apparatus such as video camera and sill cameras, and an operation device such as remoter controllers. The exemplary embodiment of the present disclosure may be applied to a processing IC that can be incorporated into such device.

The information processing apparatus according to the exemplary embodiment may be applied to a system composed of one or more apparatuses under the condition that the one or more apparatuses are connected to a network (or using the communication between apparatuses), such as cloud computing. In other words, the information processing apparatus according to the exemplary embodiment as described above may be implemented as an information processing system having a plurality of apparatuses that perform the process for implementing the information processing method according to the exemplary embodiment.

The control target apparatus has been described as an exemplary embodiment, but the embodiment of the present disclosure is not limited thereto. The exemplary embodiment of the present disclosure may be applied to various types of devices including a computer such as PCs and servers, communication apparatus such as mobile phones and smartphones, tablet type apparatus, imaging apparatus such as video camera and sill cameras, and a television set. The exemplary embodiment of the present disclosure may be applied to a processing IC that can be incorporated into such device.

(Program According to Exemplary Embodiment)

A program for causing a computer to function as the information processing apparatus according to the exemplary embodiment may be executed by a processor or like device in the computer (e.g., a program for executing the process such as the control process for implementing the information processing method according to the exemplary embodiment). Thus, the communication using a plurality of difference communication modes can be controlled.

Moreover, when a program that causes a computer to function as the information processing apparatus according to the present embodiment is executed by a processor or the like in the computer, it is possible to provide an effect provided by the processing related to the information processing method according to the present embodiment described above.

It should be understood by those skilled in the art that various modifications, combinations, sub-combinations and alterations may occur depending on design requirements and other factors insofar as they are within the scope of the appended claims or the equivalents thereof.

For example, it has been illustrated above that a program (computer program) that causes a computer to function as the information processing apparatus according to the present embodiment is provided, but the present embodiment can further provide a recording medium in which the above-described program is stored together.

(Application Example of Information Processing Apparatus and Control Target Apparatus According to Exemplary Embodiment)

An overview of an application example (a live-view remote control) of the information processing apparatus and the control target apparatus according to the exemplary embodiment will be described with reference to FIG. 12. FIG. 12 is a diagram illustrated to describe an overview of an application example (a live-view remote control) of the information processing apparatus and the control target apparatus according to the exemplary embodiment.

An information processing apparatus 1000 shown in FIG. 12 is a portable mobile communication terminal carried by the user, and performs a communication connection with a plurality of imaging apparatuses control target apparatus) 2000. The information processing apparatus 1000 is configured to include a display unit 1100 for displaying an image. The information processing apparatus 1000 may acquire an image from each of the imaging apparatuses 2000 via communication and may display the acquired image on the display unit 1100.

As an example, as shown in the left side of FIG. 12, the information processing apparatus 1000 may communicate with the imaging apparatuses 2000A to 2000C and may display an image acquired from the imaging apparatus 2000A on the display unit 1100. The two-dot chain line shown in FIG. 12 indicates the state where the information processing apparatus 1000 is connected to the imaging apparatus 2000, and the arrow shown in FIG. 12 indicates the data communication between the information processing apparatus 1000 and the imaging apparatus 2000.

When the communication connection with an apparatus providing an image is disconnected, an image is generally not obtained via the communication. Thus, the user waits for the reconnection of the apparatus or performs an operation for connection with another apparatus to acquire an image from the other apparatus. When the information processing apparatus 1000 no longer receive any image from the imaging apparatus 2000, the information processing apparatus 1000 automatically switches an image to be displayed to an image received from another imaging apparatus 2000.

For example, the imaging apparatuses 2000A to 2000C may be mounted to a surfboard, the imaging apparatus 2000A may be installed in the front part of the surfboard in the direction opposite to the traveling direction of the surf, and the imaging apparatus 2000B may be installed in the front part of the surfboard in the traveling direction of the surf. Thus, as shown in FIG. 12, the information processing apparatus 1000 display an image, for example, a person in surfing received from the imaging apparatus 2000A on the display unit 1100.

When the information processing apparatus 1000 is disconnected from the imaging apparatus 2000A and no longer receive any image, the information processing apparatus 1000 automatically changes the displayed image to an image received from the imaging apparatus 2000B.

In this way, the information processing apparatus 1000 according to one embodiment of the present disclosure, when failing to receive an image from the imaging apparatus 2000, automatically changes an image to be displayed to an image to be received from another imaging apparatus 2000. This allows images to be continuously received and displayed without interruption, and thus it is possible to reduce the user's waiting time necessary for image display and the user operation load. Although FIG. 12 illustrates a display-mounted remote controller as an example of the information processing apparatus 1000, the information processing apparatus 1000 may be a mobile communication terminal such as smartphones, tablet terminals, digital cameras, portable game consoles, and personal digital assistants (PDAs).

The application example of the information processing apparatus and the control target apparatus has been described above. The configuration of the application example of the information processing apparatus and the control target apparatus will be described with reference to FIG. 13. FIG. 13 is a block diagram illustrating a specific functional configuration of the application example of the information processing apparatus and the control target apparatus.

As shown in FIG. 13, the information processing apparatus 1000 is configured to include a communication unit 1020, a storage unit 1040, an operation unit 1060, a display controller 1080, and a display unit 1100.

The communication unit 1020 communicates with the imaging apparatus (control target apparatus) 2000. Specifically, the communication unit 1020 receives a request to transmit the image obtained by capturing in the imaging apparatus 2000 and receives the image data. For example, the communication unit 1020 can communicate wirelessly using Wi-Fi (registered trademark), Bluetooth (registered trademark), Zigbee (registered trademark), and other communication standards.

The storage unit 1040 stores a history of the process performed by the information processing apparatus 1000, and specifically, the storage unit 1040 stores a history of images displayed by the display controller 1080.

The operation unit 1060 converts a user operation on the information processing apparatus 1000 into input. Specifically, the operation unit 1060 generates input information corresponding to the operation performed by the user and provides the generated input information for the processing functional unit of the information processing apparatus 1000, for example, the display controller 1080. For example, the operation unit 1060 may be a button type or touch pad type input device.

The display controller 1080 controls a display operation of the display unit 1100. Specifically, the display controller 1080 allows the display unit 1100 to display an image received via the communication unit 1020. When an image to be displayed on the display unit 110 is not received any longer via the communication unit 1020, the display controller 1080 changes an image to be displayed to an image received from an apparatus specified according to the history created on the basis of the communication among the imaging apparatuses 2000 connected thereto. For example, the display controller 1080 allows the storage unit 1040 to store the display history of the image received from the imaging apparatus 2000 as an example of the history created on the basis of the communication. The display controller 1080 may change the displayed image to an image received from the imaging apparatus 2000 specified according to the display history stored in the storage unit 1040. In this way, the display history of the image is a display history of the image acquired on the basis of the communication with the imaging apparatus 2000. The display history may contain a display start time and display end time of an image.

The above-described configurations express examples of embodiment and, of course, pertain to the technical scope of the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1) An information processing apparatus, comprising:
a control circuitry configured to:
control communication with another information processing apparatus using a first communication mode;
control communication with the another information processing apparatus using a second communication mode;
establish a first connection with the another information processing apparatus using the first communication mode; and
prompt the another processing apparatus to execute a process through the first connection after establishing the first connection with the another information processing apparatus but prior to completing, through the first connection, a second connection with the another information processing apparatus using the second communication mode.

(2) The information processing apparatus according to (1), wherein the control circuitry is further configured to perform receive communication-related information and control information from the another information processing apparatus.

(3) The information processing apparatus according to (1), further comprising:
a first communication device configured to communicate with the another information processing apparatus using the first communication mode; and
a second communication device configured to communicate with the another information processing apparatus using the second communication mode.

(4) The information processing apparatus according to (1), further comprising:
an operation input device connected to an input-output interface of the information processing apparatus configured to transmit a request for execution of the information processing apparatus process to the control circuitry.

(5) The information processing apparatus according to (1), further comprising:
an imaging device including a lens-imaging element module, configured to have an image capturing function.

(6) The information processing apparatus according to (1), wherein the information processing apparatus is one of a smartphone or a camera.

(7) The information processing apparatus according to (1), wherein the another information processing apparatus is one of a plurality of information processing apparatuses, and
the information processing apparatus is a portable communication terminal configured to communicate with the plurality of information processing apparatuses (8) The information processing apparatus according to (2), wherein the control circuitry is further configured to transmit a connection request through the first connection to establish communication using the second communication mode to the another information processing apparatus based on the communication-related information.

(9) The information processing apparatus according to (2), wherein the execution of the process is based on the control information.

(10) The information processing apparatus according to (4), further comprising:
a display, coupled to the input-output interface and configured to display an image on a display screen.

(11) The information processing apparatus according to (7), wherein the portable communication terminal acquires an image from each of the plurality of information processing apparatuses.

(12) The information processing apparatus according to (11), wherein the portable communication terminal automatically changes the image to a different image from the plurality of information processing apparatuses.

(13) The information processing apparatus according to (1), wherein the first communication mode is compliant to IEEE 802.11 standard and the second communication mode is compliant to IEEE 802.15.1 standard.

(14) The information processing apparatus according to (13), wherein the control circuitry is configured to prompt the another processing apparatus to transmit live-view image data to the information processing apparatus through the first connection.

(15) An information processing apparatus, comprising:
a control circuitry configured to:
control communication with another information processing apparatus using a first communication mode;
control communication with the another information processing apparatus using a second communication mode;
establish a first connection with the another information processing apparatus using the first communication mode; and
execute a process through the first connection after establishing the first connection with the another information processing apparatus but prior to completing, through the first connection, a second connection with the another information processing apparatus using the second communication mode.

(16) The information processing apparatus according to (15), wherein the control circuitry is further configured to perform transmit communication-related information and control information to the information processing apparatus.

(17) The information processing apparatus according to (15), further comprising:
a first communication device configured to communicate with the another information processing apparatus using the first communication mode; and
a second communication device configured to communicate with the another information processing apparatus using the second communication mode.

(18) The information processing apparatus according to (15), further comprising:
an operation input device connected to an input-output interface of the information processing apparatus configured to receive a request for execution of the information processing apparatus process to the control circuitry.

(19) The information processing apparatus according to (15), further comprising:

an imaging device including a lens-imaging element module and a signal processing circuit, configured to have an image capturing function.

(20) The information processing apparatus according to (15), wherein the information processing apparatus is one of of a smartphone, a camera, a television set or a server.

(21) The information processing apparatus according to (15), wherein the information processing apparatus is one of a plurality of information processing apparatuses, and
the another information processing apparatus is a portable communication terminal configured to communicate with the plurality of information processing apparatuses.

(22) The information processing apparatus according to (16), wherein the control circuitry is further configured to receive a connection request to establish communication through the first connection using the second communication mode to the information processing apparatus based on the communication-related information.

(23) The information processing apparatus according to (16), wherein the execution of the process is based on the control information.

(24) The information processing apparatus according to (18), further comprising:
a display, coupled to the input-output interface and configured to display an image on a display screen.

(25) The information processing apparatus according to (21), wherein the portable communication terminal acquires an image from each of the plurality of information processing apparatuses.

(26) The information processing apparatus according to (25), wherein the portable communication terminal automatically changes the image to a different image from the plurality of information processing apparatuses.

(27) The information processing apparatus according to (15), wherein the first communication mode is compliant to IEEE 802.11 standard and the second communication mode is compliant to IEEE 802.15.1 standard.

(28) The information processing apparatus according to (27), wherein the control circuitry is configured to transmit live-view image data to the another information processing apparatus through the first connection.

(29) A method of information processing, comprising:
controlling, by a control circuitry, communication with another information processing apparatus using a first communication mode;
controlling, by the control circuitry, communication with the another information processing apparatus using a second communication mode;
establishing, by the control circuitry, a first connection with the another information processing apparatus using the first communication mode; and
prompting, by the control circuitry, execution of a process through the first connection after establishing the first connection with the another information processing apparatus but prior to completing, through the first connection, a second connection with the another information processing apparatus using the second communication mode.

(30) A non-transitory computer readable medium storing a program executable by a processor to perform operations comprising:
controlling, by a control circuitry, communication with an another information processing apparatus using a first communication mode;
controlling, by the control circuitry, communication with the another information processing apparatus using a second communication mode;

establishing, by the control circuitry, a first connection with the another information processing apparatus using the first communication mode; and prompting, by the control circuitry, execution of a process through the first connection after establishing the first connection with the another information processing apparatus but prior to completing, through the first connection, a second connection with the another information processing apparatus through the first connection using the second communication mode.

(31) An information processing system comprising:

a first information processing apparatus including a first control circuitry;

a second information processing apparatus including a second control circuitry;

wherein the first control circuitry is configured to:

control communication with the second information processing apparatus using a first communication mode;

control communication with the second information processing apparatus using a second communication mode;

establish a first connection with the second information processing apparatus using the first communication mode; and prompt execution of the a process through the first connection after establishing the first connection with the second information processing apparatus but prior to completing, through the first connection, a second connection with the second information processing apparatus using the second communication mode; and wherein the second control circuitry is configured to:

control communication with the first information processing apparatus using the first communication mode;

control communication with the first information processing apparatus using the second communication mode;

establish the first connection with the first information processing apparatus using first communication mode; and execute the process through the first connection after establishing the first connection with the first information processing apparatus but prior to completing, through the first connection, the second connection with the first information processing apparatus using the second communication mode.

(32) An information processing apparatus including:

a controller configured to control communication using a first communication mode and communication using a second communication mode different from the first communication mode, wherein the controller acquires communication-related information and control information from a control target apparatus, the communication-related information indicating whether the control target apparatus is allowed to communicate using the second communication mode, the control information being related to a process executable by the control target apparatus, transmits, upon establishing communication with the control target apparatus using the first communication mode, a connection request used to establish communication using the second communication mode to the control target apparatus based on the communication-related information, and transmits a process execution request used to perform the process executable by the control target apparatus to the control target apparatus based on the control information.

(33) The information processing apparatus according to (32), wherein the controller determines whether the control target apparatus is allowed to communicate using the second communication mode based on the communication-related information, and transmits the connection request to the control target apparatus, upon determining that communication using the second communication mode is allowed.

(34) The information processing apparatus according to (32), wherein the controller determines whether the control target apparatus is allowed to communicate using the second communication mode based on information indicating whether the control target apparatus is allowed to process the connection request through communication using the first communication mode, the information used for the determination being the communication-related information.

(35) The information processing apparatus according to (33) or (34), wherein the controller determines whether the control target apparatus is allowed to communicate using the second communication mode based on information indicating whether the control target apparatus is allowed to process a connection establishment completion confirmation request being used to request information indicating whether a connection establishment using the second communication mode is completed in the control target apparatus, the information used for the determination being the communication-related information.

(36) The information processing apparatus according to any one of (32) to (35), wherein the connection request is a request used to establish communication using the second communication mode between the information processing apparatus and the control target apparatus.

(37) The information processing apparatus according to (36), wherein the controller transmits the process execution request through communication using the second communication mode established between the information processing apparatus and the control target apparatus.

(38) The information processing apparatus according to any one of (32) to (35), wherein the connection request is a request used to establish communication using the second communication mode between the control target apparatus and another control target apparatus different from the control target apparatus.

(39) The information processing apparatus according to any one of (32) to (38), wherein the controller transmits the process execution request through the communication established using the first communication mode.

(40) The information processing apparatus according to any one of (32) to (39), wherein the controller performs a process of transmitting the connection request and a process of transmitting the process execution request in parallel.

(41) The information processing apparatus according to any one of (32) to (40), wherein the first communication mode is a non-directional wireless communication mode.

(42) The information processing apparatus according to (41), wherein the non-directional wireless communication mode is and the second communication mode is Bluetooth (registered trademark).

(43) The information processing apparatus according to any one of (32) to (42), wherein the control information is information relating to an imaging process to be executed by the control target apparatus.

(44) The information processing apparatus according to any one of (32) to (43),
wherein the controller performs control for acquiring information used to establish the first communication mode using a short-range wireless communication scheme from the control target apparatus, and performs communication control for establishing the first communication mode based on the information used to establish the first communication mode.

(45) An information processing method executed by an information processing apparatus, the method including:
controlling communication using a first communication mode and communication using a second communication mode different from the first communication mode, wherein the controlling step includes
acquiring communication-related information and control information from a control target apparatus, the communication-related information indicating whether the control target apparatus is allowed to communicate using the second communication mode, the control information being related to a process executable by the control target apparatus,
transmitting, upon establishing communication with the control target apparatus using the first communication mode, a connection request used to establish communication using the second communication mode to the control target apparatus based on the communication-related information, and
transmitting a process execution request used to perform the process executable by the control target apparatus to the control target apparatus based on the control information.

(46) A program for causing a computer to execute:
controlling communication using a first communication mode and communication using a second communication mode different from the first communication mode, wherein the controlling step includes
acquiring communication-related information and control information from a control target apparatus, the communication-related information indicating whether the control target apparatus is allowed to communicate using the second communication mode, the control information being related to a process executable by the control target apparatus,
transmitting, upon establishing communication with the control target apparatus using the first communication mode, a connection request used to establish communication using the second communication mode to the control target apparatus based on the communication-related information, and
transmitting a process execution request used to perform the process executable by the control target apparatus to the control target apparatus based on the control information.

REFERENCE SIGNS LIST 10, 30 smartphone
20 camera
40 television set
50 server
60 relay
100 information processing apparatus
102, 202 first communication unit
104, 204 second communication unit
106, 206 controller
108 operation unit
200 control target apparatus
210 display unit
212 imaging unit
1000 information processing apparatus
1020 communication unit
1040 storage unit
1060 operation unit
1080 display controller
2000 imaging apparatus

The invention claimed is:

1. An information processing apparatus, comprising:
a memory; and
a control circuitry configured to:
control communication with a target information processing apparatus using a first communication mode;
control communication with the target information processing apparatus using a second communication mode;
establish a first connection with the target information processing apparatus using the first communication mode; and
prompt the target processing apparatus to execute, in parallel,
a first process for establishing a second connection with the target information processing apparatus using the second communication mode, and
a second process through the first connection after establishing the first connection with the target information processing apparatus but prior to completing, through the first connection, the establishing of the second connection, wherein the second process is a process executable by the target information processing apparatus to transmit a live-view image data to the information processing apparatus through the first connection.

2. The information processing apparatus according to claim 1, wherein the control circuitry is further configured to receive communication-related information and control information from the target information processing apparatus.

3. The information processing apparatus according to claim 2, wherein the control circuitry is further configured to transmit a connection request through the first connection to establish communication using the second communication mode to the target information processing apparatus based on the communication-related information.

4. The information processing apparatus according to claim 2, wherein the execution of the process is based on the control information.

5. The information processing apparatus according to claim 1, further comprising:
a first communication device configured to communicate with the target information processing apparatus using the first communication mode; and
a second communication device configured to communicate with the target information processing apparatus using the second communication mode.

6. The information processing apparatus according to claim 1, further comprising:
an operation input device connected to an input-output interface of the information processing apparatus and configured to transmit a request for execution of the information processing apparatus process to the control circuitry.

7. The information processing apparatus according to claim 6, further comprising:
a display, coupled to the input-output interface and configured to display an image on a display screen.

8. The information processing apparatus according to claim 1, further comprising:

an imaging device including a lens-imaging element module, and configured to have an image capturing function.

9. The information processing apparatus according to claim 1, wherein the information processing apparatus is one of a smartphone or a camera.

10. The information processing apparatus according to claim 1, wherein the target information processing apparatus is one of a plurality of external information processing apparatuses, and
the information processing apparatus is a portable communication terminal configured to communicate with the plurality of external information processing apparatuses.

11. The information processing apparatus according to claim 10, wherein the portable communication terminal acquires a plurality of images respectively from corresponding ones of the plurality of external information processing apparatuses.

12. The information processing apparatus according to claim 11, wherein the portable communication terminal automatically changes a displayed image from a first image of the plurality of images to a second image of the plurality of images.

13. The information processing apparatus according to claim 1, wherein the first communication mode is compliant to an IEEE 802.11 standard and the second communication mode is compliant to an IEEE 802.15.1 standard.

14. An information processing apparatus, comprising:
a memory; and
a control circuitry configured to:
control communication with a target information processing apparatus using a first communication mode;
control communication with the target information processing apparatus using a second communication mode;
establish a first connection with the target information processing apparatus using the first communication mode; and
execute, in parallel,
a first process for establishing a second connection with the target information processing apparatus using the second communication mode, and
a second process through the first connection after establishing the first connection with the target information processing apparatus but prior to completing, through the first connection, the establishing of the second connection, wherein the second process is a process executable by the information processing apparatus to transmit a live-view image data to the target information processing apparatus through the first connection.

15. The information processing apparatus according to claim 14, wherein the control circuitry is further configured to transmit communication-related information and control information to the target information processing apparatus.

16. The information processing apparatus according to claim 15, wherein the control circuitry is further configured to receive a connection request to establish communication through the first connection using the second communication mode to the target information processing apparatus based on the communication-related information.

17. The information processing apparatus according to claim 15, wherein the execution of the process is based on the control information.

18. The information processing apparatus according to claim 14, further comprising:
a first communication device configured to communicate with the target information processing apparatus using the first communication mode; and
a second communication device configured to communicate with the target information processing apparatus using the second communication mode.

19. The information processing apparatus according to claim 14, further comprising:
an operation input device connected to an input-output interface of the information processing apparatus and configured to receive a request for execution of the information processing apparatus process to the control circuitry.

20. The information processing apparatus according to claim 19, further comprising:
a display, coupled to the input-output interface and configured to display an image on a display screen.

21. The information processing apparatus according to claim 14, further comprising:
an imaging device including a lens-imaging element module and a signal processing circuit, and configured to have an image capturing function.

22. The information processing apparatus according to claim 14, wherein the information processing apparatus is one of a smartphone, a camera, a television set or a server.

23. The information processing apparatus according to claim 14, wherein the information processing apparatus is one of a plurality of controllable information processing apparatuses, and
the target information processing apparatus is a portable communication terminal configured to communicate with the plurality of controllable information processing apparatuses.

24. The information processing apparatus according to claim 23, wherein the portable communication terminal acquires a plurality of images respectively from corresponding ones of the plurality of controllable information processing apparatuses.

25. The information processing apparatus according to claim 24, wherein the portable communication terminal automatically changes a displayed image from a first image of the plurality of images to a second image of the plurality of images.

26. The information processing apparatus according to claim 14, wherein the first communication mode is compliant to an IEEE 802.11 standard and the second communication mode is compliant to an IEEE 802.15.1 standard.

27. A method of information processing, comprising:
controlling, by a control circuitry, communication with a target information processing apparatus using a first communication mode;
controlling, by the control circuitry, communication with the target information processing apparatus using a second communication mode;
establishing, by the control circuitry, a first connection with the target information processing apparatus using the first communication mode; and
prompting, by the control circuitry, execution in parallel of
a first process for establishing a second connection with the target information processing apparatus using the second communication mode, and
a second process through the first connection after establishing the first connection with the target information processing apparatus but prior to completing, through the first connection, the establishing of the second connection, wherein the second process is a process executable by the target information processing apparatus to transmit a live-view image data to the information processing apparatus through the first connection.

28. A non-transitory computer readable medium storing a program executable by a processor to perform operations comprising:
controlling, by a control circuitry, communication with a target information processing apparatus using a first communication mode;
controlling, by the control circuitry, communication with the target information processing apparatus using a second communication mode;
establishing, by the control circuitry, a first connection with the target information processing apparatus using the first communication mode; and
prompting, by the control circuitry, execution in parallel of
a first process for establishing a second connection with the target information processing apparatus using the second communication mode, and
a second process through the first connection after establishing the first connection with the target information processing apparatus but prior to completing, through the first connection, the establishing of the second connection, wherein the second process is a process executable by the target information processing apparatus to transmit a live-view image data to the information processing apparatus through the first connection.

29. An information processing system comprising:
a first information processing apparatus including a first control circuitry;
a second information processing apparatus including a second control circuitry;
wherein the first control circuitry is configured to:
control communication with the second information processing apparatus using a first communication mode;
control communication with the second information processing apparatus using a second communication mode;
establish a first connection with the second information processing apparatus using the first communication mode; and
prompt execution, in parallel, of a first process for establishing a second connection with the target information processing apparatus using the second communication mode, and a second process through the first connection after establishing the first connection with the second information processing apparatus but prior to completing, through the first connection, the establishing of the second connection; and
wherein the second control circuitry is configured to:
control communication with the first information processing apparatus using the first communication mode;
control communication with the first information processing apparatus using the second communication mode;
establish the first connection with the first information processing apparatus using the first communication mode; and
execute, in parallel, the first process and the second process, wherein the second process is a process executable by the second information processing apparatus to transmit a live-view image data to the first information processing apparatus through the first connection.

* * * * *